(12) United States Patent
Sauerwein et al.

(10) Patent No.: US 10,344,516 B2
(45) Date of Patent: *Jul. 9, 2019

(54) VEHICLE DOOR CONTROL SYSTEM

(71) Applicant: WARREN INDUSTRIES LTD., Concord (CA)

(72) Inventors: Sven Sauerwein, Newmarket (CA); Douglas Broadhead, Brampton (CA); Markus Hetzler, Stouffville (CA); Gareth Kenworthy, Stouffville (CA); Mitchell English, North York (CA); Pasit Banjongpanith, Stouffville (CA)

(73) Assignee: Warren Industries Ltd., Concord (CA)

( * ) Notice: Subject to any disclaimer, the term of this patent is extended or adjusted under 35 U.S.C. 154(b) by 72 days.

This patent is subject to a terminal disclaimer.

(21) Appl. No.: 15/595,634

(22) Filed: May 15, 2017

(65) Prior Publication Data
US 2017/0260790 A1  Sep. 14, 2017

Related U.S. Application Data

(63) Continuation of application No. 14/379,462, filed as application No. PCT/CA2014/000109 on Feb. 14, 2014, now Pat. No. 9,650,824.
(Continued)

(51) Int. Cl.
*E05F 3/04* (2006.01)
*E05F 15/53* (2015.01)
(Continued)

(52) U.S. Cl.
CPC .................. *E05F 3/04* (2013.01); *B60J 5/04* (2013.01); *B60J 5/0493* (2013.01);
(Continued)

(58) Field of Classification Search
CPC . E05F 3/04; E05F 15/53; E05F 15/614; E05F 15/70; E05F 3/02; E05F 5/00;
(Continued)

(56) References Cited

U.S. PATENT DOCUMENTS

| 2,079,054 A | 1/1937 | Vadasz |
| 3,584,333 A | 6/1971 | Hakala |

(Continued)

FOREIGN PATENT DOCUMENTS

| CN | 103057491 A | 4/2013 |
| DE | 10320148 A1 | 12/2004 |

(Continued)

OTHER PUBLICATIONS

PCT/CA2014/000109 International Search Report dated Feb. 14, 2014.
Japanese Office Action for JP 2016-520052 dated Feb. 5, 2018.

*Primary Examiner* — Nga X Nguyen
(74) *Attorney, Agent, or Firm* — Millman IP Inc.

(57) ABSTRACT

In an aspect, a vehicle door control system for a vehicle having a vehicle body and a vehicle door is provided, and includes a check arm having an end that is mounted to one of the vehicle body and the vehicle door, a check arm holder at least a portion of which is mounted to the other of the vehicle body and the vehicle door, and a controller. The check arm holder is configured to apply at least three different amounts of braking force to the check arm. The controller is programmed to control the operation of the check arm holder based on input from at least one sensor.

12 Claims, 30 Drawing Sheets

Related U.S. Application Data

(60) Provisional application No. 61/895,790, filed on Oct. 25, 2013, provisional application No. 61/885,361, filed on Oct. 1, 2013.

(51) Int. Cl.

| | | |
|---|---|---|
| *E05F 15/614* | (2015.01) | |
| *E05F 15/70* | (2015.01) | |
| *E05F 3/02* | (2006.01) | |
| *E05F 5/00* | (2017.01) | |
| *E05C 17/00* | (2006.01) | |
| *E05C 17/20* | (2006.01) | |
| *E05C 17/22* | (2006.01) | |
| *B60J 5/04* | (2006.01) | |
| *G05D 3/10* | (2006.01) | |

(52) U.S. Cl.
CPC .......... *E05C 17/003* (2013.01); *E05C 17/203* (2013.01); *E05C 17/22* (2013.01); *E05F 3/02* (2013.01); *E05F 5/00* (2013.01); *E05F 15/53* (2015.01); *E05F 15/614* (2015.01); *E05F 15/70* (2015.01); *G05D 3/10* (2013.01); *E05Y 2201/21* (2013.01); *E05Y 2201/218* (2013.01); *E05Y 2400/36* (2013.01); *E05Y 2900/531* (2013.01)

(58) Field of Classification Search
CPC ...... E05C 17/22; E05C 17/203; E05C 17/003; B60J 5/04; B60J 5/0493; G05D 3/10; E05Y 2900/531; E05Y 2400/36; E05Y 2201/218; E05Y 2201/21
USPC .......................................................... 701/49
See application file for complete search history.

(56) References Cited

U.S. PATENT DOCUMENTS

| | | |
|---|---|---|
| 3,643,289 A | 2/1972 | Lohr |
| 3,743,047 A | 7/1973 | Marchisano |
| 3,965,531 A | 6/1976 | Fox et al. |
| 4,280,599 A | 7/1981 | Bardfeld |
| 4,332,056 A | 6/1982 | Griffin et al. |
| 4,458,446 A | 7/1984 | Mochida et al. |
| 4,628,568 A | 12/1986 | Lee et al. |
| 4,674,230 A * | 6/1987 | Takeo ................... E05C 17/003 49/28 |
| 4,698,622 A | 10/1987 | Goto et al. |
| 5,039,144 A | 8/1991 | Jayne |
| 5,173,991 A | 12/1992 | Schoeffler |
| 5,346,272 A | 9/1994 | Priest et al. |
| 5,533,795 A | 7/1996 | Brooks |
| 5,873,622 A | 2/1999 | Kluting et al. |
| 6,052,870 A | 4/2000 | Hagenlocher et al. |
| 6,065,185 A | 5/2000 | Breed et al. |
| 6,175,204 B1 | 1/2001 | Calamatas |
| 6,225,768 B1 | 5/2001 | Cookson et al. |
| 6,370,732 B1 | 4/2002 | Yezersky et al. |
| 6,442,800 B1 | 9/2002 | Morawetz |
| 6,513,193 B1 | 2/2003 | Yezersky et al. |
| 6,516,495 B1 | 2/2003 | Hartmann |
| 6,681,444 B2 | 1/2004 | Breed et al. |
| 6,744,365 B2 | 6/2004 | Sicuranza |
| 6,842,943 B2 | 1/2005 | Jackson |
| 6,901,630 B2 | 6/2005 | Williams |
| 6,962,023 B2 | 11/2005 | Daniels et al. |
| 7,076,833 B2 | 7/2006 | Murayama et al. |
| 7,151,350 B2 | 12/2006 | Haag et al. |
| 7,175,227 B2 | 2/2007 | Menard |
| 7,280,035 B2 | 10/2007 | McLain et al. |
| 7,500,711 B1 | 3/2009 | Ewing et al. |
| 7,530,141 B2 | 5/2009 | Mah |
| 7,552,953 B2 | 6/2009 | Estremsky |
| 7,578,029 B2 | 8/2009 | Prieur |
| 7,586,402 B2 | 9/2009 | Bihler et al. |
| 7,686,378 B2 | 3/2010 | Gisler et al. |
| 7,761,209 B2 | 7/2010 | Morris et al. |
| 7,845,053 B2 | 12/2010 | Marsh et al. |
| 7,938,473 B2 | 5/2011 | Paton et al. |
| 7,941,972 B2 | 5/2011 | Kamiya et al. |
| 7,977,903 B2 | 7/2011 | Kamiya |
| 8,020,683 B2 | 9/2011 | Borys et al. |
| 8,077,024 B2 | 12/2011 | Laufer et al. |
| 8,104,823 B2 | 1/2012 | Kohlstrand |
| 8,280,593 B2 | 10/2012 | Nakakura et al. |
| 2001/0042820 A1 | 11/2001 | Wilson |
| 2004/0055110 A1* | 3/2004 | Breed .................. E05C 17/203 16/82 |
| 2004/0200149 A1 | 10/2004 | Dickmann et al. |
| 2005/0085972 A1 | 4/2005 | Martinez |
| 2007/0266635 A1 | 11/2007 | Sugiura et al. |
| 2009/0000196 A1 | 1/2009 | Kollar et al. |
| 2010/0024301 A1 | 2/2010 | Wuerstlein et al. |
| 2010/0076651 A1 | 3/2010 | Nakakura et al. |
| 2010/0082206 A1 | 4/2010 | Kollar et al. |
| 2011/0266080 A1 | 11/2011 | Schmitt |
| 2011/0295469 A1 | 12/2011 | Rafii et al. |
| 2013/0074412 A1 | 3/2013 | Wellborn et al. |

FOREIGN PATENT DOCUMENTS

| | | |
|---|---|---|
| EP | 0580147 A1 | 1/1994 |
| EP | 1205620 A1 | 5/2002 |
| JP | 09060386 A | 3/1997 |
| JP | 2000168519 A | 6/2000 |
| JP | 2003-003717 A | 1/2003 |
| JP | 2005226297 A | 8/2005 |
| JP | 2007-537398 A | 12/2007 |
| KR | 102003067779 A | 8/2003 |
| KR | 20050097780 A | 10/2005 |
| KR | 20060069634 A | 6/2006 |
| KR | 1020070056266 A | 6/2007 |
| KR | 102005045396 B1 | 4/2010 |
| WO | 2004001170 A1 | 12/2003 |
| WO | 2006072315 A1 | 7/2006 |
| WO | 2006072319 A1 | 7/2006 |
| WO | 2010098619 A2 | 9/2010 |
| WO | 2010098620 A2 | 9/2010 |
| WO | 2012161404 A1 | 11/2012 |

* cited by examiner

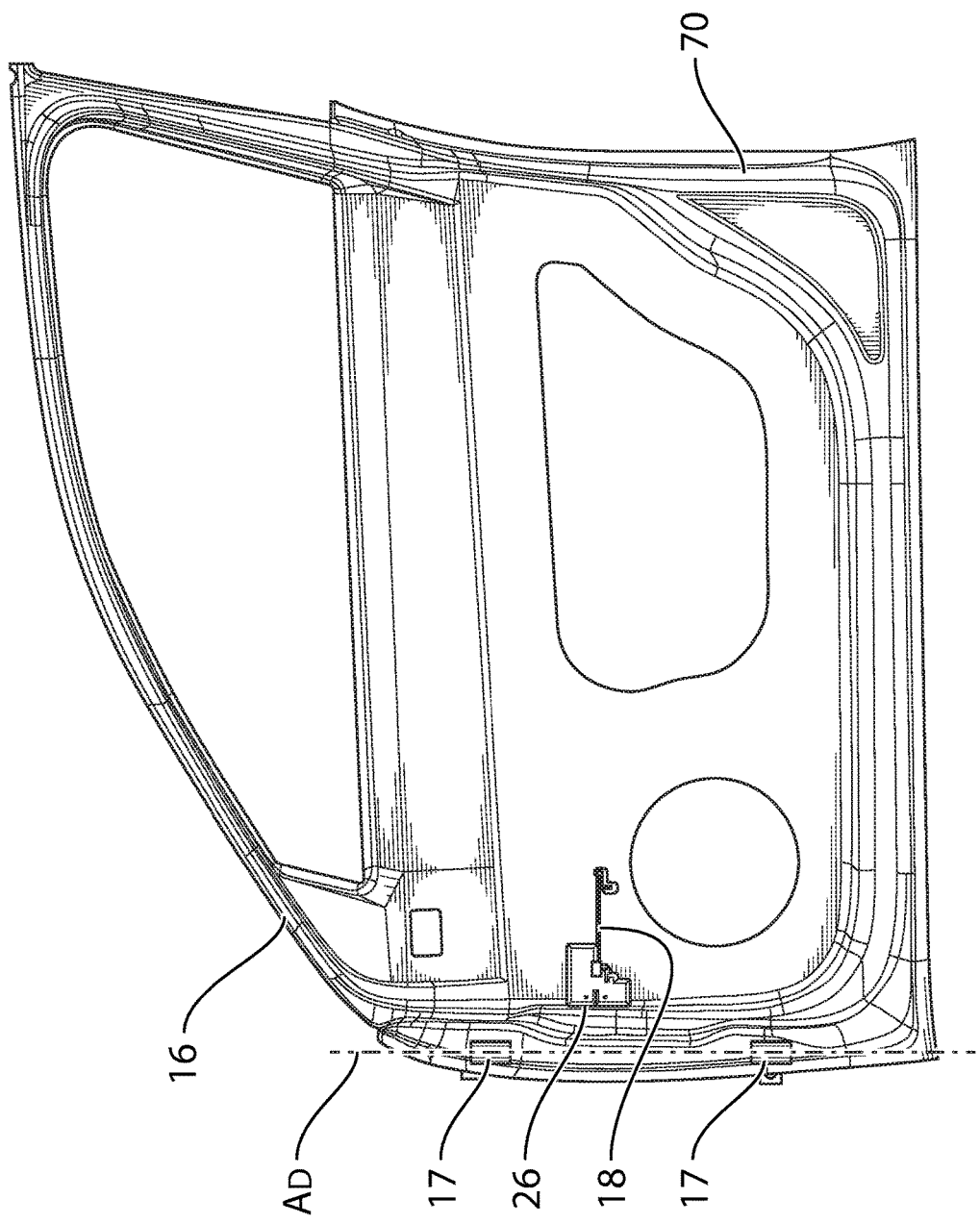

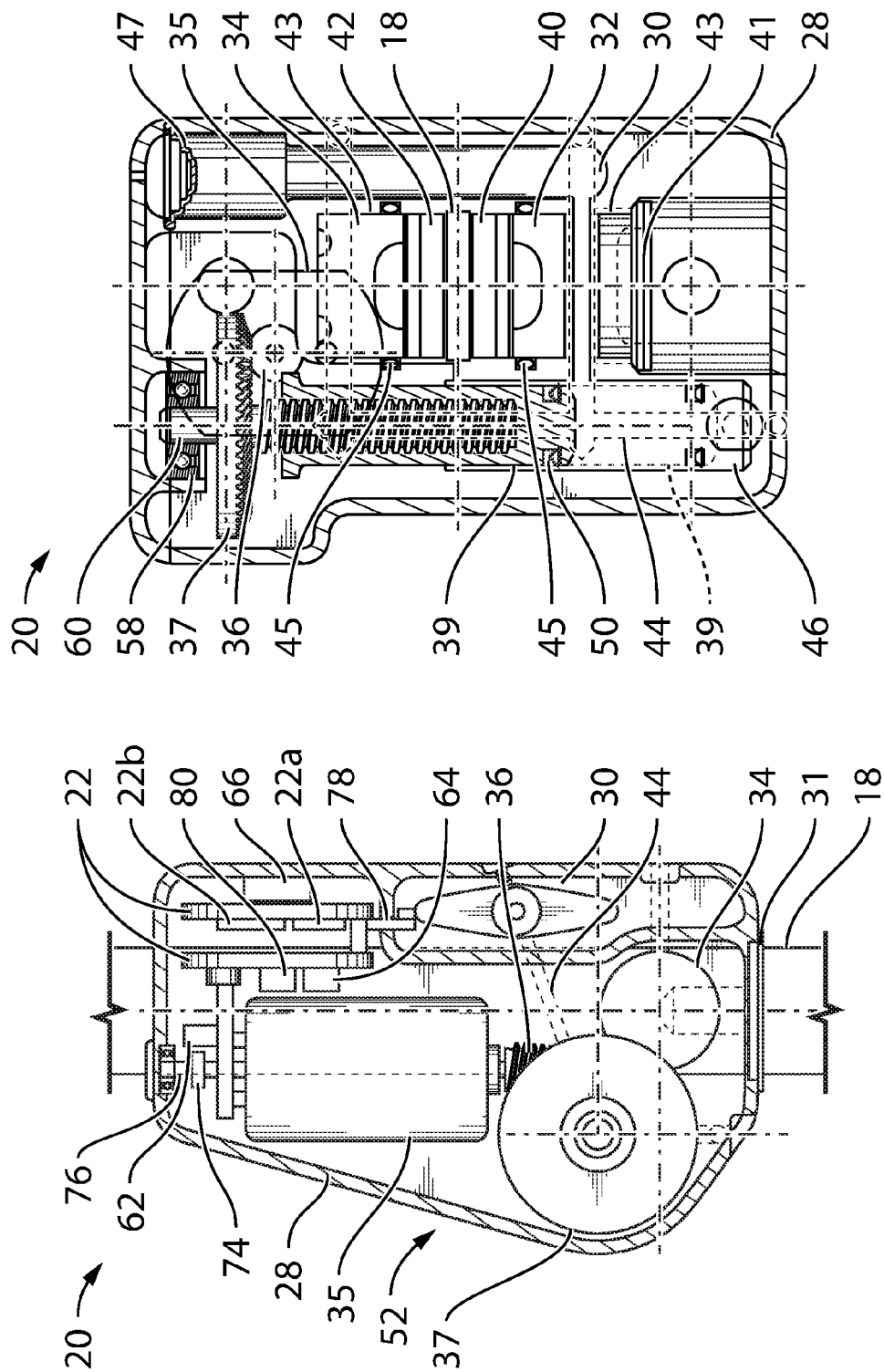

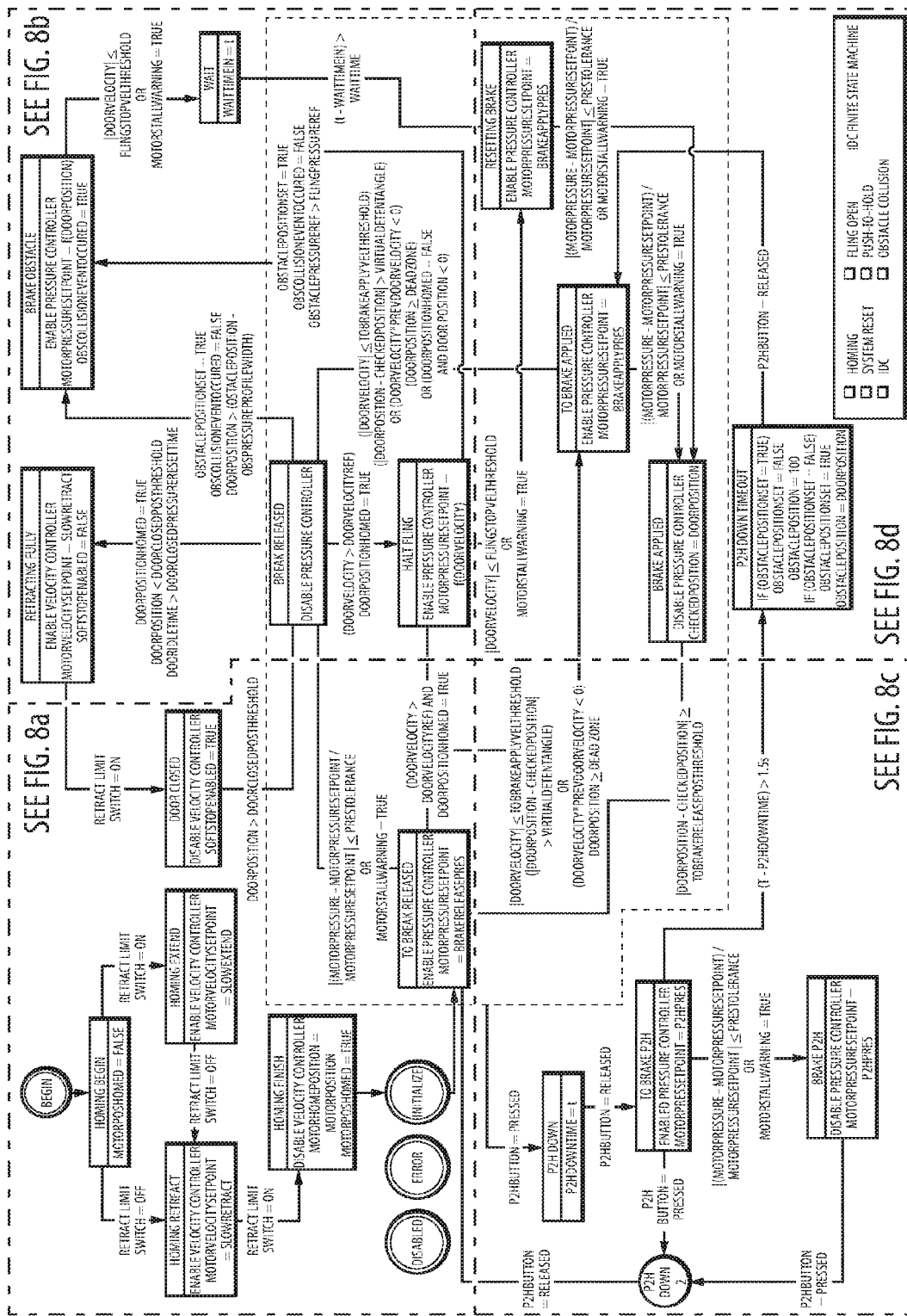

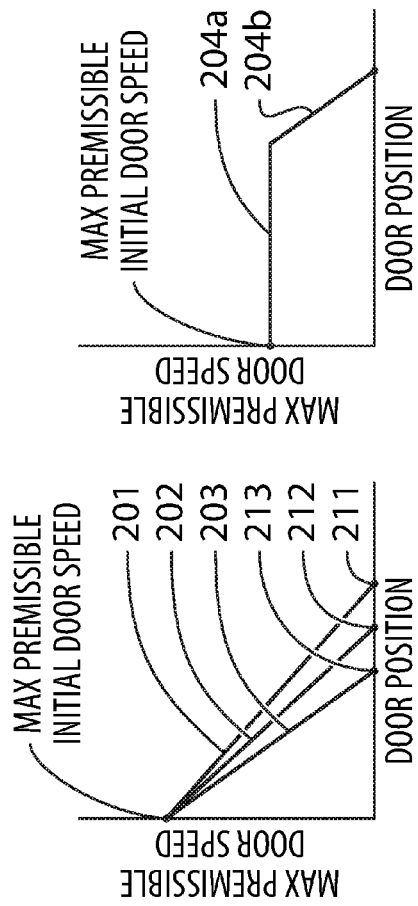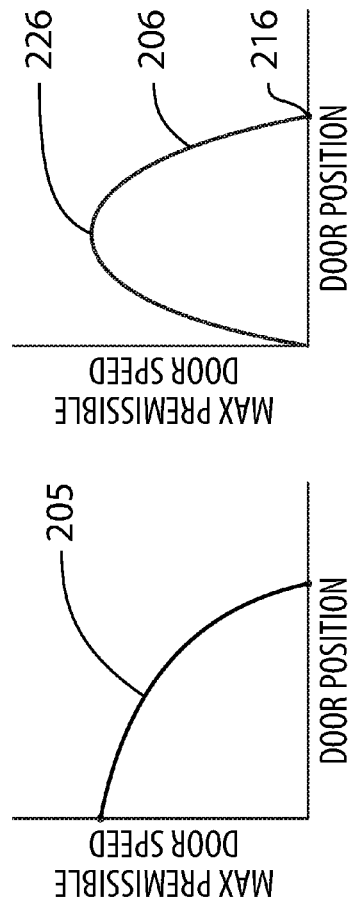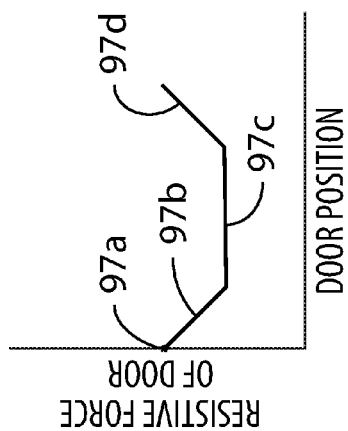

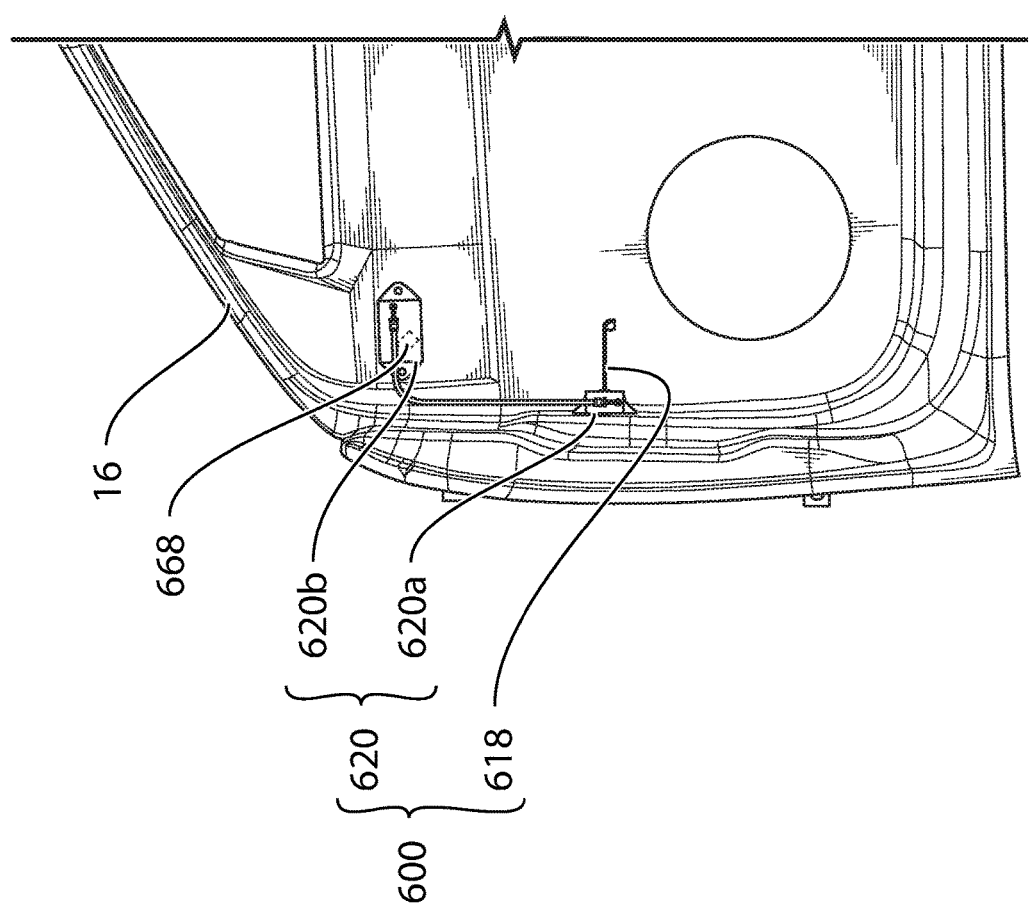

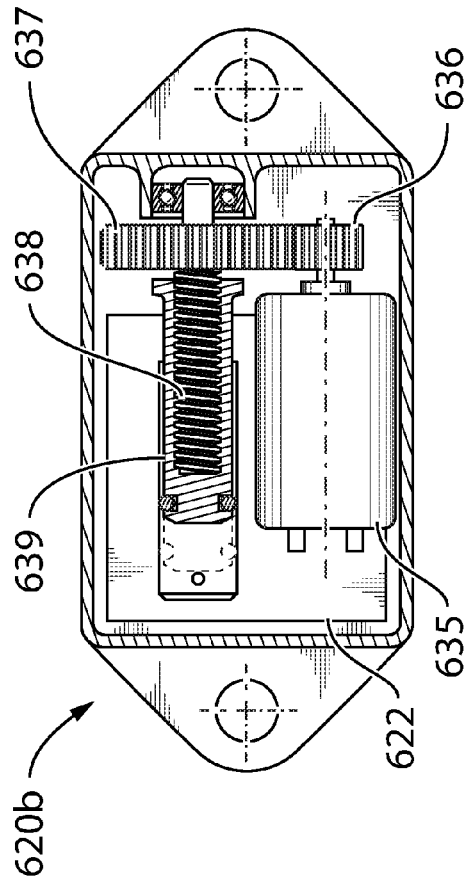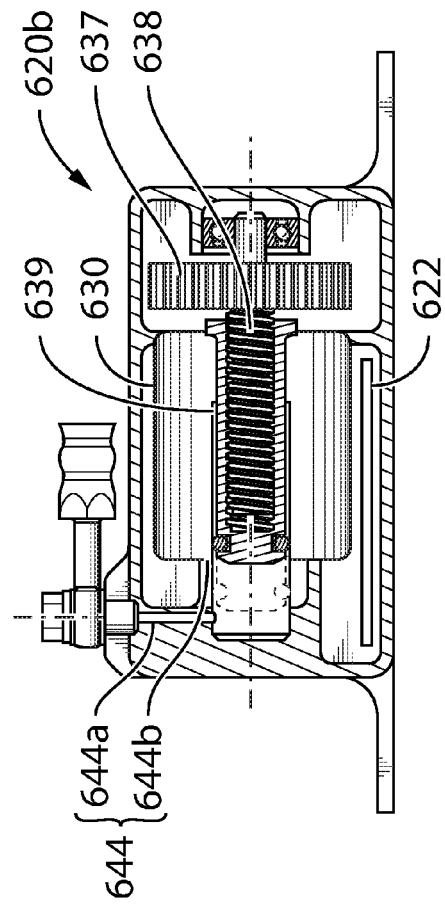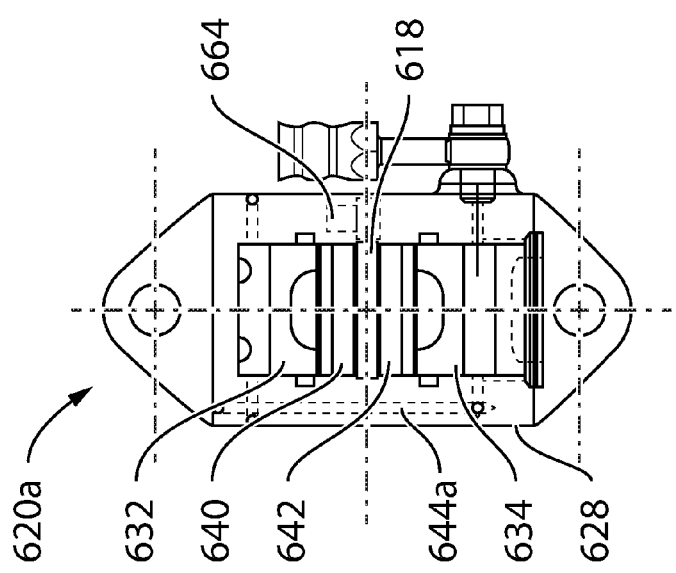

VEHICLE DOOR CONTROL SYSTEM

CROSS-REFERENCE TO RELATED APPLICATIONS

This application is a continuation of U.S. application Ser. No. 14/379,462 filed Aug. 18, 2014, which is a national stage entry of PCT/CA2014/000109 filed Feb. 14, 2014, which claims priority to U.S. Provisional Patent Application No. 61/885,361 filed Oct. 1, 2013, and U.S. Provisional Patent Application No. 61/895,790 filed Oct. 25, 2013, the contents of both of which are incorporated herein in their entirety.

FIELD

This disclosure relates generally to vehicle door check systems and more particularly to infinite door check systems that permit a user to select a position at which a door is to be checked.

BACKGROUND

Vehicle doors are typically swung between fully closed and fully opened positions to permit ingress and egress of passengers to and from a vehicle. A door check system is typically employed to provide one or more intermediate holding positions for the door for convenience. Traditional door check systems suffer from a number of deficiencies, however. For example, the intermediate positions provided by the door check system can sometimes be inconvenient in the sense that they either don't give a vehicle user sufficient room to enter or leave the vehicle, or they are positioned so far outward that the door is at risk of hitting a door from an adjacent parked vehicle (e.g. in a mall parking lot). Furthermore, the door check system may be configured to permit easy use of the door by a certain segment of the general population, but the door may be difficult to use by a different segment of the general population. Additionally, there are numerous situations in which the door can unintendedly swing open and hit an adjacent vehicle.

The patent literature contains some proposed door check systems that permit a user to select where a door is stopped. Such systems tend to be very limited in their capabilities, however, and in some instances can be very large, intruding significantly on the already restricted amount of space available inside a vehicle door. It would be beneficial to provide a door check system that at least partially addresses one or more of the problems described above or other problems associated with door check systems of the prior art.

SUMMARY

In an aspect, a vehicle door control system for a vehicle having a vehicle body and a vehicle door is provided, and includes a check arm having an end that is mounted to one of the vehicle body and the vehicle door, a check arm holder at least a portion of which is mounted to the other of the vehicle body and the vehicle door, and a controller. The check arm holder is configured to apply at least three different amounts of braking force to the check arm. The controller is programmed to control the operation of the check arm holder based on input from at least one sensor.

In another aspect, a vehicle door control system is provided for a vehicle having a vehicle body and a vehicle door. The door control system includes a check arm mounted to one of the vehicle body and the vehicle door, a check arm holder at least a portion of which is mounted to the other of the vehicle body and the vehicle door, and a controller. The check arm holder is configured to apply a variable braking force to the check arm. The controller is programmed to reduce the speed of the door by adjustment of the braking force upon determining that the speed of the door exceeds a maximum permissible door speed. The maximum permissible door speed is adjustable.

In yet another aspect, a vehicle door control system is provided for a vehicle having a vehicle body and a vehicle door, including a check arm mounted to one of the vehicle body and the vehicle door, a check arm holder mounted to the other of the vehicle body and the vehicle door, and a controller, wherein the controller is programmed to adjust the braking force based on the angle of the vehicle.

In yet another aspect, a vehicle door control system is provided for a vehicle having a vehicle body and a vehicle door, including a check arm mounted to one of the vehicle body and the vehicle door, a check arm holder mounted to the other of the vehicle body and the vehicle door, and a controller, wherein the controller is programmed to receive input from a user of the vehicle that lets the user select the amount of braking force that is applied to the check arm during movement of the door.

In yet another aspect, a vehicle door control system is provided for a vehicle having a vehicle body and a vehicle door, including a check arm mounted to one of the vehicle body and the vehicle door, a check arm holder mounted to the other of the vehicle body and the vehicle door, and a controller, wherein the controller is programmed to control a maximum open position for the door based on sensor data relating to the position of an adjacent obstacle.

In yet another aspect, a vehicle door control system is provided for a vehicle having a vehicle body and a vehicle door. The door control system includes a check arm mounted to one of the vehicle body and the vehicle door, a check arm holder at least a portion of which is mounted to the other of the vehicle body and the vehicle door, and a controller. The check arm holder is configured to apply a variable braking force to the check arm. At least one force-sensing device is positioned to sense an initiation force being exerted on the vehicle door by a user. A controller is programmed to control the braking force applied by the check arm holder based at least in part on whether the initiation force exceeds a threshold force.

In yet another aspect, the invention relates to a vehicle door control system for a vehicle having a vehicle body and a vehicle door, comprising a check arm having an end that is mounted to one of the vehicle body and the vehicle door, a check arm holder mounted to at least one of the vehicle body and the vehicle door, and a controller. The check arm holder is configured to apply a check force to the check arm. The controller is programmed to control the operation of the check arm holder based on input from a temperature sensor.

Other inventive aspects of the present disclosure will become readily apparent based on the teachings contained herein.

BRIEF DESCRIPTION OF THE DRAWINGS

The foregoing and other aspects will now be described by way of example only with reference to the attached drawings, in which:

FIG. 2 is a side view of the door shown in FIG. 1;

FIG. 6 is a plan view of the door control system shown in FIG. 3 with a portion of the housing cut away;

FIG. 7 is a sectional front view of the door control system shown in FIG. 3;

FIG. 8 is a state diagram for the door control system shown in FIG. 1;

FIG. 8E is a graph illustrating an example relationship between the resistive force applied by the check arm holder and the door position;

FIGS. 9A-9D are graphs illustrating example relationships between a maximum permissible door speed and door position;

FIG. 21 is a side view of a door that includes an alternative embodiment of a door control system;

FIG. 22 is an end view of a first subassembly that is part of the door control system shown in FIG. 21;

FIGS. 23A and 23B are plan and side views of a second subassembly that is part of the door control system shown in FIG. 21;

DETAILED DESCRIPTION

Figure 1:
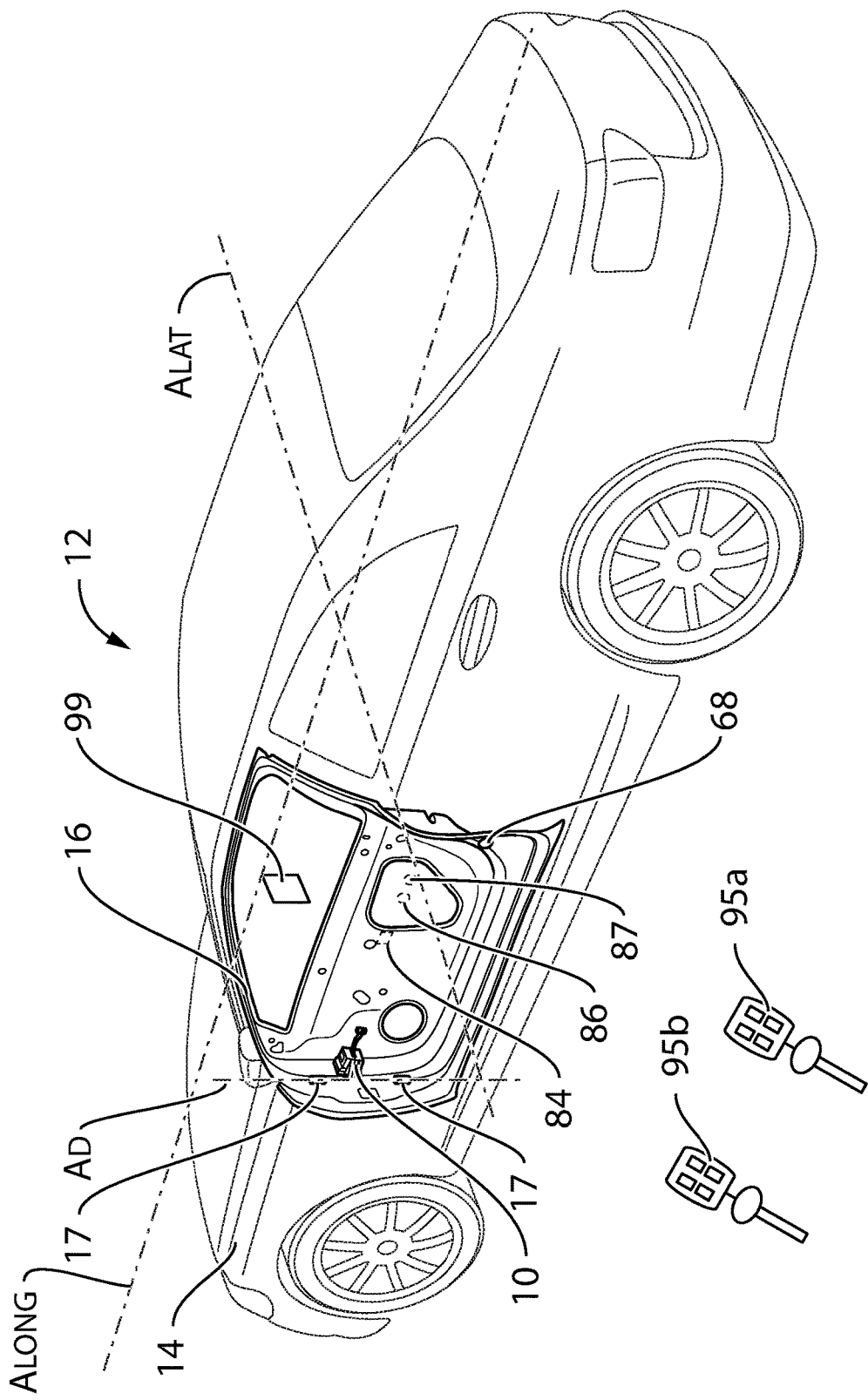
FIG. 1 is a perspective view of a vehicle that includes a door and a door control system in accordance with an embodiment of the present invention.
Figure 3:
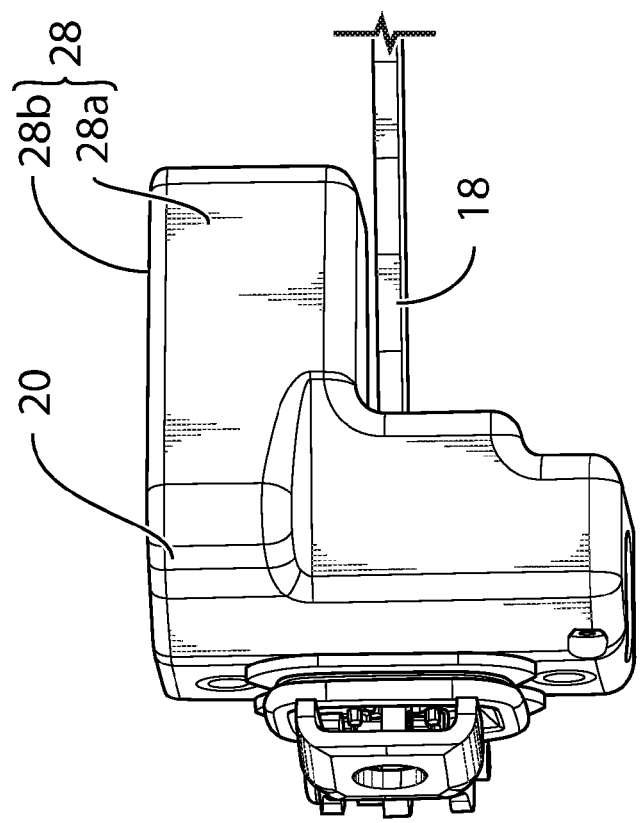
FIG. 3 is a magnified perspective view of the door control system shown in FIG. 1, including a check arm and a check arm holder.

Reference is made to FIG. 1, which shows a vehicle door control system 10 for a vehicle 12 having a vehicle body 14 and a vehicle door 16 pivotally mounted to the body 14 by way of hinges 17 for pivoting movement about a door pivot axis $A_D$, in accordance with an embodiment of the present disclosure. In some embodiments, the vehicle door control system 10 can check the door 16 in a user-selectable position somewhere in a range of door movement between a fully open position and a fully closed position. In some embodiments, the door control system 10 can check the door 16 anywhere within the aforementioned range of movement, providing infinite door check capability. In other embodiments, the door control system 10 can check the door 16 in a user-selected position selected from amongst one or more discrete positions within the aforementioned range of movement.

In some embodiments, the door control system 10 may only permit the user to check the door 16 in a certain portion of the range of movement. For example, in some instances this may be to inhibit the door 16 from being checked when it is very near to its fully closed position (as described further below).

Figure 5:
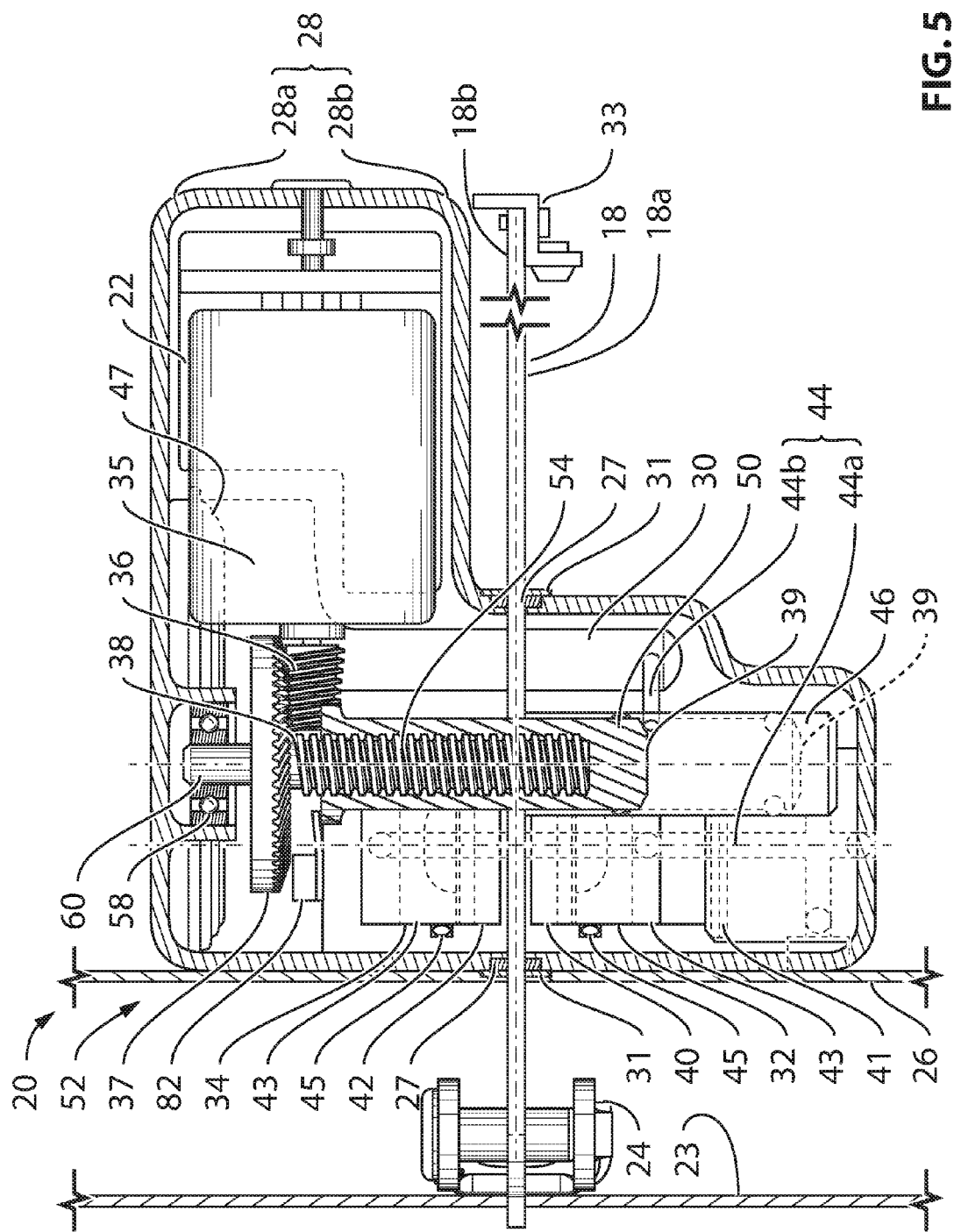
FIG. 5 is a sectional side view of the door control system shown in FIG. 3.

Referring to FIG. 2, the door control system 10 includes a check arm 18, a check arm holder 20 and a controller 22 (FIG. 5). The check arm 18 may be mounted to one of the vehicle body and the vehicle door, and the check arm holder 20 may be mounted to the other of the vehicle body and the vehicle door. In the embodiment shown in FIG. 5, the check arm 18 is mounted to the vehicle body 14 and the check arm holder 20 is mounted to the vehicle door 16. More particularly, the check arm 18 is pivotally mounted to a portion of the door aperture (shown at 23) on the vehicle body 14 via a pin connection shown at 24, while the check arm holder 20 is fixedly mounted to the inside surface of the forward edge face (shown at 26) of the door 16.

The check arm holder 20 is shown in more detail in FIGS. 3-7. The check arm holder 20 includes a housing 28 (shown in FIGS. 3, 4A and 5-7 but omitted from FIG. 4B). Referring to FIGS. 4B-7, the check arm holder further 20 includes a fluid reservoir 30, first and second brake members 32 and 34 (which in this instance may be pistons), a motor 35, a spiral bevel pinion 36, a spiral bevel ring gear 37, a lead screw 38 and a master piston 39. Any other suitable gear arrangement is alternatively possible such as for example a worm and worm wheel combination, or two spur gears. Additionally, while two gears are shown in the gear arrangement, it is alternatively possible to provide a gear arrangement containing three or more gears.

The housing 28 may be formed from two housing members 28a and 28b that mate together to enclose the other components. The housing 28 contains a pass-through aperture 29 for the check arm 18. A seal 31 may be provided at each end of the aperture 29 so as to prevent dirt and debris that may build up on the check arm 18 from getting into the check arm holder 20 during sliding movement of the check arm 18 through the holder 20. Additionally, a guide member 27 may be provided at each end of the aperture 29 so as to guide the movement of the check arm 18 along a selected path through the housing 28.

A limit member 33 (FIGS. 4B and 5) may be provided on the free end of the check arm 18 so as to engage the housing 28 when the door 16 when the door is opened to a selected angle, so as to provide a mechanical limit for the maximum open position of the door 16.

The first and second brake pistons 32 and 34 are movable by way of fluid pressure, between a check position in which the pistons 32 and 34 apply a holding force (also referred to as a check force) to the check arm 18 and a retracted position wherein the pistons 32 and 34 are retracted from the check position. In the retracted position, the brake pistons 32 and 34 may be spaced from the check arm 18 so as not to apply any braking force to the check arm 18. Alternatively, in the retracted position, the pistons 32 and 34 may continue to apply a braking force on the check arm 18 but a smaller braking force than in the check position. The overall movement between the advanced and retracted positions may be relatively small, and in some cases less than 1 mm.

As shown in FIG. 7, a plug 41 plugs a bore 43 that is provided in the housing 28 and that holds the brake pistons 32 and 34. Brake piston seals 45 are provided to seal between the bore 43 and the pistons 32 and 34 to prevent leakage of fluid out of the housing 28 past the pistons 32 and 34. The seals 45 may be O-rings provided in the housing 28 as shown, or alternatively on the pistons 32 and 34. Any other suitable seals may alternatively be provided.

While two movable brake members 32 and 34 are shown in FIGS. 4B-7, in an alternative embodiment a single moveable brake member could be used to advance and retract on one side of the check arm 18, so as to clamp the check arm 18 against a stationary brake member on the other side of the check arm 18. Embodiments incorporating a single moving brake member are described further below with reference to FIGS. 12-14 and FIGS. 16-17.

Returning to FIGS. 4B-7, first and second brake pads 40 and 42 may be provided on the first and second pistons 32 and 34 to provide a selected friction coefficient with the sides 18a and 18b of the check arm 18.

A fluid passage system 44 connects the fluid reservoir 30 to the first and second brake pistons 32 and 34. The fluid itself may be an incompressible fluid such as hydraulic oil, or a compressible fluid such as a gas. In the embodiment shown the fluid is hydraulic oil. A bellows 47 (FIG. 7) is provided at an end of the fluid reservoir 30 to accommodate thermal expansion of the fluid in the fluid passage system 44.

In an embodiment, the master piston 39 is positioned in a master piston chamber 46 that is fluidically between the reservoir 30 and the first and second brake pistons 32 and 34, and that divides the fluid passage system 44 into a first portion 44a which is connected to the brake pistons 32 and 34 and a second portion 44b which is connected to the reservoir 30. The master piston 39 is movable between a retracted position wherein the master piston chamber 46 fluidically connects the first and second portions 44a and 44b and generates a low fluid pressure state in the fluid passage system 44, and an advanced position wherein the piston 39 disconnects the first portion 44a from the second portion 44b and generates a high fluid pressure state in the first portion 44a.

Movement of the master piston 39 to the advanced position brings the brake pistons 32 and 34 to their advanced positions. In embodiments wherein the fluid in the fluid passage system 44 is brought to a sufficiently low pressure when the master piston 39 is moved to the retracted position, such movement may force the pistons 32 and 34 to a retracted position wherein the pistons 32 and 34 are spaced from the check arm 18 so as not to apply any braking force to the check arm 18. Such an embodiment may be used wherein it is desired at some point to be able to move the door 16 with substantially no resistance. For example, in embodiments wherein the door 16 is relatively heavy, it may be desirable to provide no further resistance to movement of the door 16 beyond the resistance provided by the inertia of the door 16 itself.

The master piston 39 may be movable to a plurality of intermediate positions between the retracted and advanced positions so as to permit adjustment of the pressure applied by the brake pistons 32 and 34 to the check arm 18. In an embodiment, the master piston 39 may be infinitely adjustable in position between its retracted and advanced positions thereby permitting infinite control over the pressure applied by the brake pistons 32 and 34.

In an alternative embodiment, movement of the master piston 39 to the retracted position results in a lower pressure than in the advanced position, but results still in a positive pressure such that the brake pistons 32 and 34 remain in engagement with the check arm 32 and continue to apply a braking force to the check arm 18, albeit a lower braking force than when the piston 39 is in the advanced position. Such an embodiment can be used, for example, in situations where it is desirable to always provide some resistance to movement to the door.

Figure 4A:
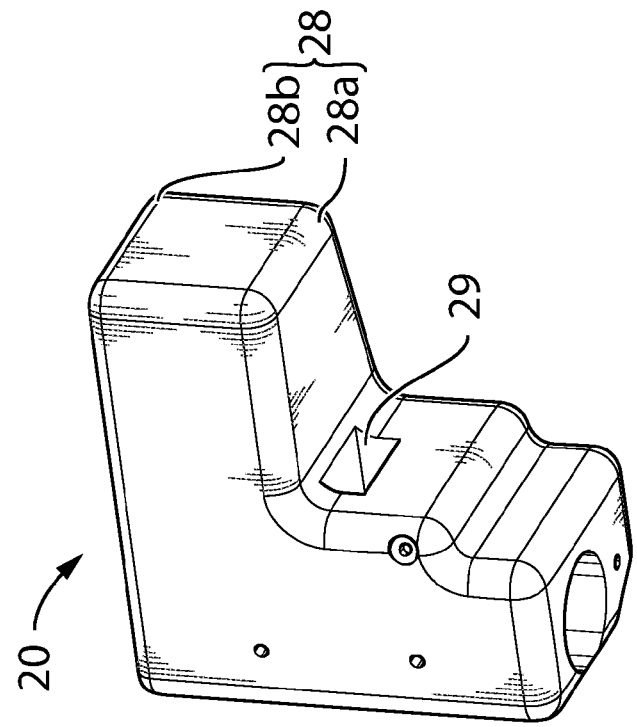
FIG. 4A is a perspective view of the check arm holder shown in FIG. 3.
Figure 4B:
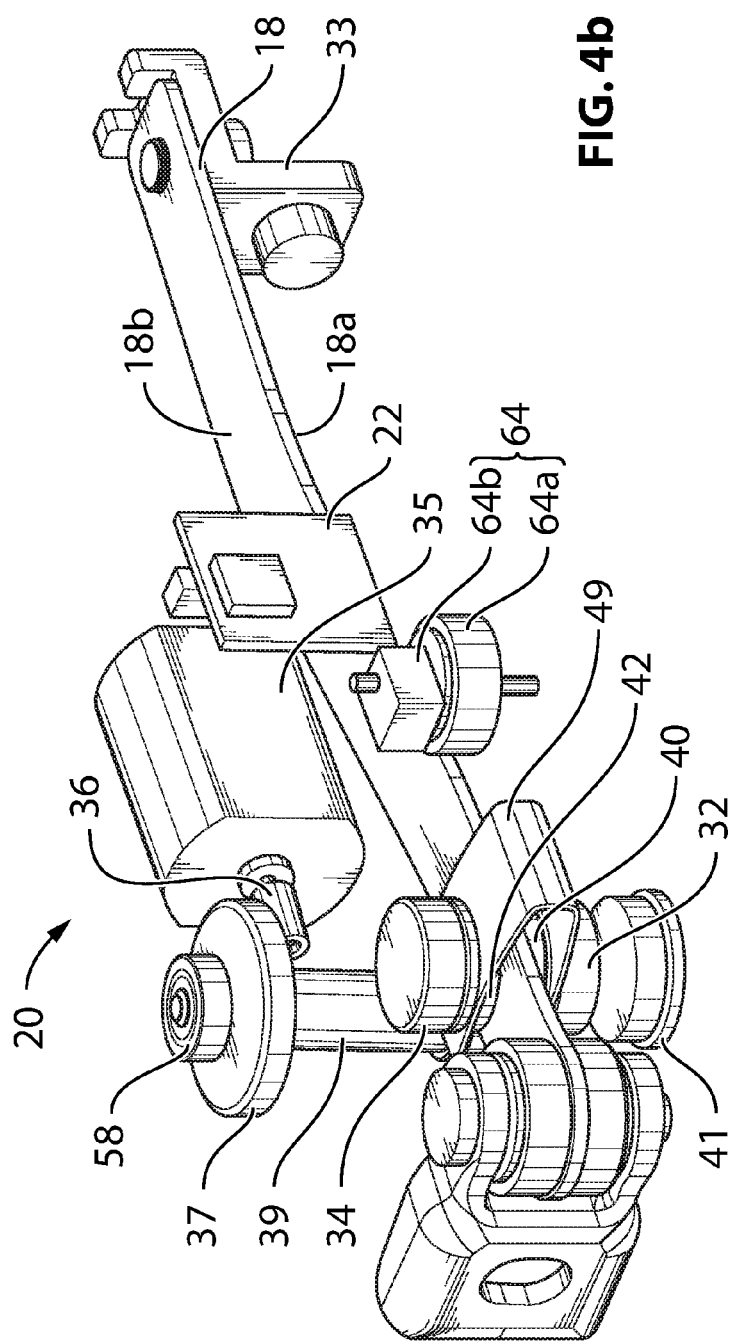
FIG. 4B is a perspective view of the internal components of the check arm holder and the check arm shown in FIG. 3, showing an example structure for determining the position of the door.

As shown in FIG. 4B, an optional piston biasing member 49 may be provided to urge the brake pistons 32 and 34 towards their retracted positions, wherein they are spaced from the check arm 18 so that they apply no braking force on the check arm 18 in the retracted position. The biasing member 49 can be configured based on the pressure in the fluid passage system 44 when the master piston 39 is in the retracted position to ensure that the pistons 32 and 34 move away from the check arm 18. The biasing member 49 may be any suitable type of biasing member, such as, for example, a generally V-shaped leaf spring. In the embodiment shown, the V-shaped biasing member 49 is engaged with shoulders on each of the brake pads 40 and 42 to assist in retracting the brake pads 40 and 42 when the pistons 32 and 34 are retracted. The brake pads 40 and 42 may alternatively or additionally be joined to pistons 32 and 34 by some other means such as by an adhesive. The piston biasing member 49 is not shown in the other figures.

Figure 11:
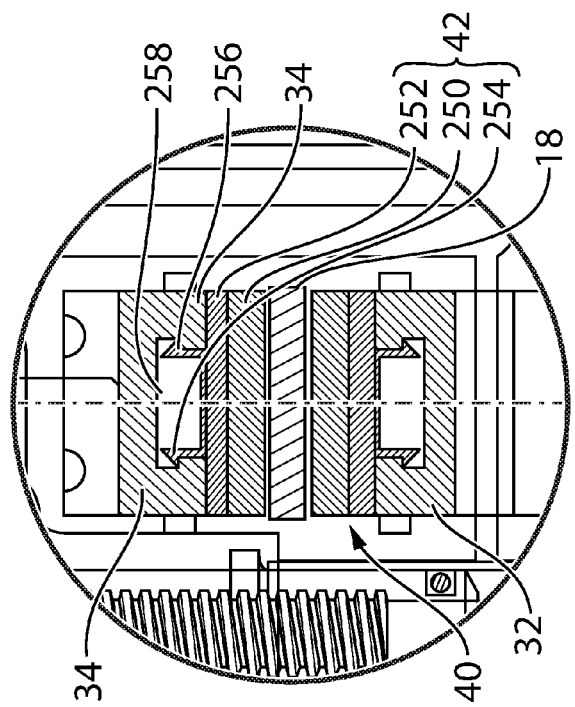
FIG. 11 is a sectional front view of brake pistons and brake pads that could be used instead of the brake pistons and brake pads shown in FIG. 7.

An alternative way of connecting the pads 40 and 42 to the pistons 32 and 34 is shown in FIG. 11. In the embodiment shown in FIG. 11, the pads 40 and 42 each include a friction material layer 250, a backing plate 252 a first side of which has the friction material layer mounted thereon via a suitable adhesive or some other suitable means, and a pad retainer 254. Each pad retainer 254, which may be a snap fit clip, is mounted to the second side of the backing plate 252, by adhesive, by a rivet, or by any other suitable means. The pad retainer 254, when in the form of a snap fit clip, may clip onto two shoulders 256 in a recess 258 in one of the pistons 32 and 34.

Referring to FIGS. 5 and 7, a suitable seal, such as an O-ring seal shown at 50 may be provided on the master piston 39 so as to form a seal with the master piston chamber 46, so as to resist leakage of fluid therepast from the first portion 44a of the fluid passage system 44 during advancement of the piston 39.

The movement of the master piston 39 may be provided by a master piston actuator 52 formed by the motor 35, the pinion 36, the ring gear 37 and the lead screw 38. More particularly, the motor 35 drives rotation of the pinion 36 by receiving electric current from a power source via the controller 22. The rotation of the pinion 36 drives rotation of the ring gear 37, which is directly connected to the lead screw 38. The master piston 39 has an internal thread 54 that is engaged by the lead screw 38, and is slidable in the chamber 46 but not rotatable in the chamber 46. Prevention of rotation of the master piston 39 may be achieved by any suitable means, such as by a flat (i.e. planar) surface on the master piston 39 that engages a flat (i.e. planar) mating surface on the housing 28. Another suitable means may be, for example, a set of ball bearings that move along parallel axially directed tracks between the piston 39 and the piston chamber 46.

Rotation of the lead screw 38 in a first direction (caused by rotation of the ring gear 37 in the first direction) advances the master piston 39, and rotation of the lead screw 38 in a second direction (caused by rotation of the ring gear 37 in the second direction) retracts the master piston 39. A thrust bearing 58 is mounted in the housing 28 to support the free end (shown at 60) of the shaft that holds the ring gear 37 and the lead screw 38. The thrust bearing supports the ring gear 37 and lead screw 38 against axial loads imparted while driving the master piston towards its advanced and retracted positions.

The controller 22 controls the operation of the check arm holder 20 (and more specifically operation of the motor 35), based on signals from at least one sensor, and in some embodiments, a plurality of sensors.

The sensors may include, for example, a motor speed sensor 62 to determine the speed of the motor 35, a door position sensor 64, a door accelerometer 66 (FIG. 6) or other similar device such as a gyroscope, a door opening obstacle sensor 68 (FIG. 1) and a door closing obstacle sensor 70 (FIG. 2). It will be noted that in some embodiments, some of these aforementioned sensors are optional. For example, in some embodiments, a door accelerometer 66 (FIG. 6) may be omitted and instead door acceleration data and door velocity data may be determined by the controller 22 based on input from the door position sensor 62.

With reference to FIG. 6, the motor speed sensor 62 may, for example, be a Hall-effect sensor that senses a magnet 74 on a ring that is on a rear portion of the output shaft (shown at 76) of the motor 35.

Figure 4C:
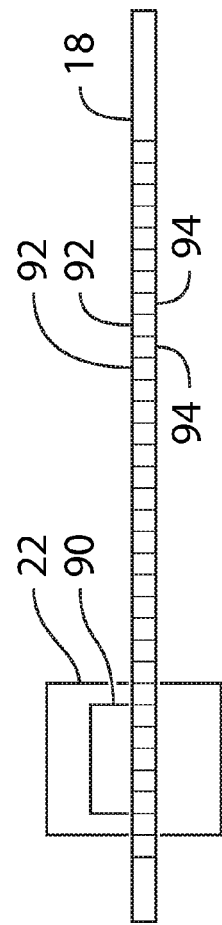
FIG. 4C is a side view of an alternative structure for determining the position of the door.

The door position sensor 64 may include, for example, a wheel 64a (FIG. 4B) that is caused to rotate by the passage of the check arm 18 through the check arm holder 20, and a rotary encoder 64b that detects the rotation of the wheel 64a. Alternatively, for example, the position sensor 64 may comprise a linear encoder that is positioned to detect a scale on the check arm 18. Such an alternative is shown in FIG. 4C. As shown, the linear Hall-effect sensor array 90 is connected to the controller 22, and the check arm 18 includes a series of magnets 92 and 94 that alternate in their orientation so that the poles facing the array 90 alternate. As the check arm 18 moves past the Hall-effect sensor array 90, the strength of the signals from the sensors will be sinusoidal, such that the array will generate sine and cosine signals that can be used to determine the position of the arm with high precision. In some embodiments a positional resolution as fine as 0.2 mm can be achieved using this technique. This permits the detection of door velocities in the range of about 1 degree per second. Other types of sensor that can be used are capacitive transducers, inductive transducers, a laser-based system, an optical sensing system, an ultrasonic sensing system, a potentiometric sensing system, an LVDT (linear variable differential transducer, a magnetoresistive sensing system or a magnetorestrictive sensing system.

Referring to FIG. 6, the door accelerometer 66 may be a 3-axis accelerometer. Door speed may be derived by the controller 22 from the change in door position over time using data from position sensor 64, or alternatively, it may be derived from the acceleration data from accelerometer 66. The accelerometer may also be used as a vehicle orientation sensor.

The door opening obstacle sensor 68 (FIG. 1) may be, for example, an ultrasonic sensor similar to the type of sensor used for collision warning on the bumpers of some vehicles. The door closing obstacle sensor 70 may be, for example, in the form of a capacitive strip that is on the seals of the door 16, as is known to be in use on closure panels of certain vehicles.

Additional sensors may be provided such as a pressure sensor 78 to determine the fluid pressure in the fluid passage system 44, a current sensor 80 (FIG. 6) for determining the current being drawn by the motor 35 and a limit switch 82 (FIG. 5) to determine when the master piston 39 is fully retracted. User-accessible controls may be provided in the vehicle cabin such as a "push-to-hold" button (referred to also as a 'press-to-hold' button and as a P2H button) shown at 84, whose function is described further below, and a resistance selector dial 86 whose function is also described further below.

Figure 8A:
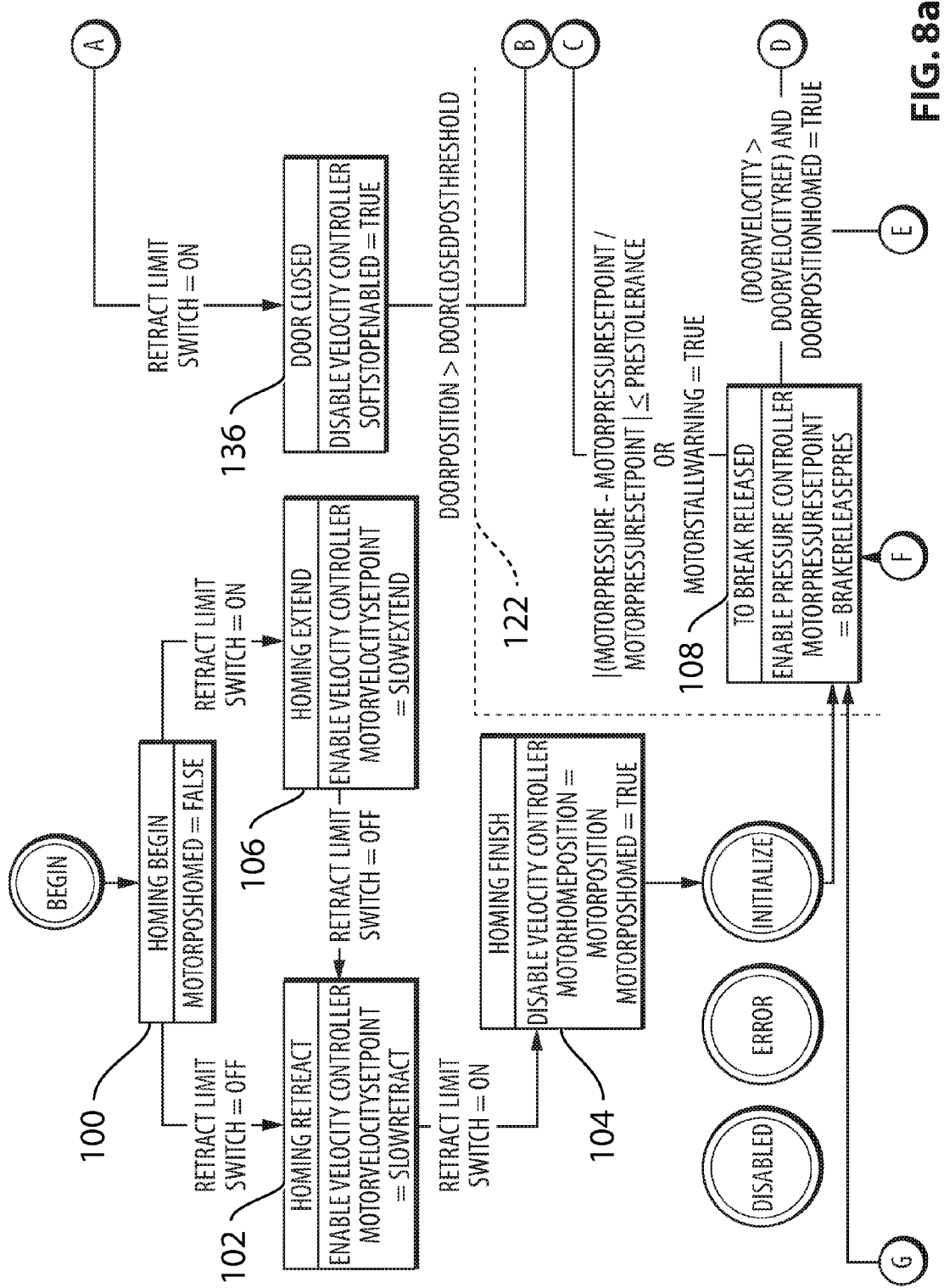
FIGS. 8A-8D are magnified portions of the state diagram shown in FIG. 8.
Figure 8B:
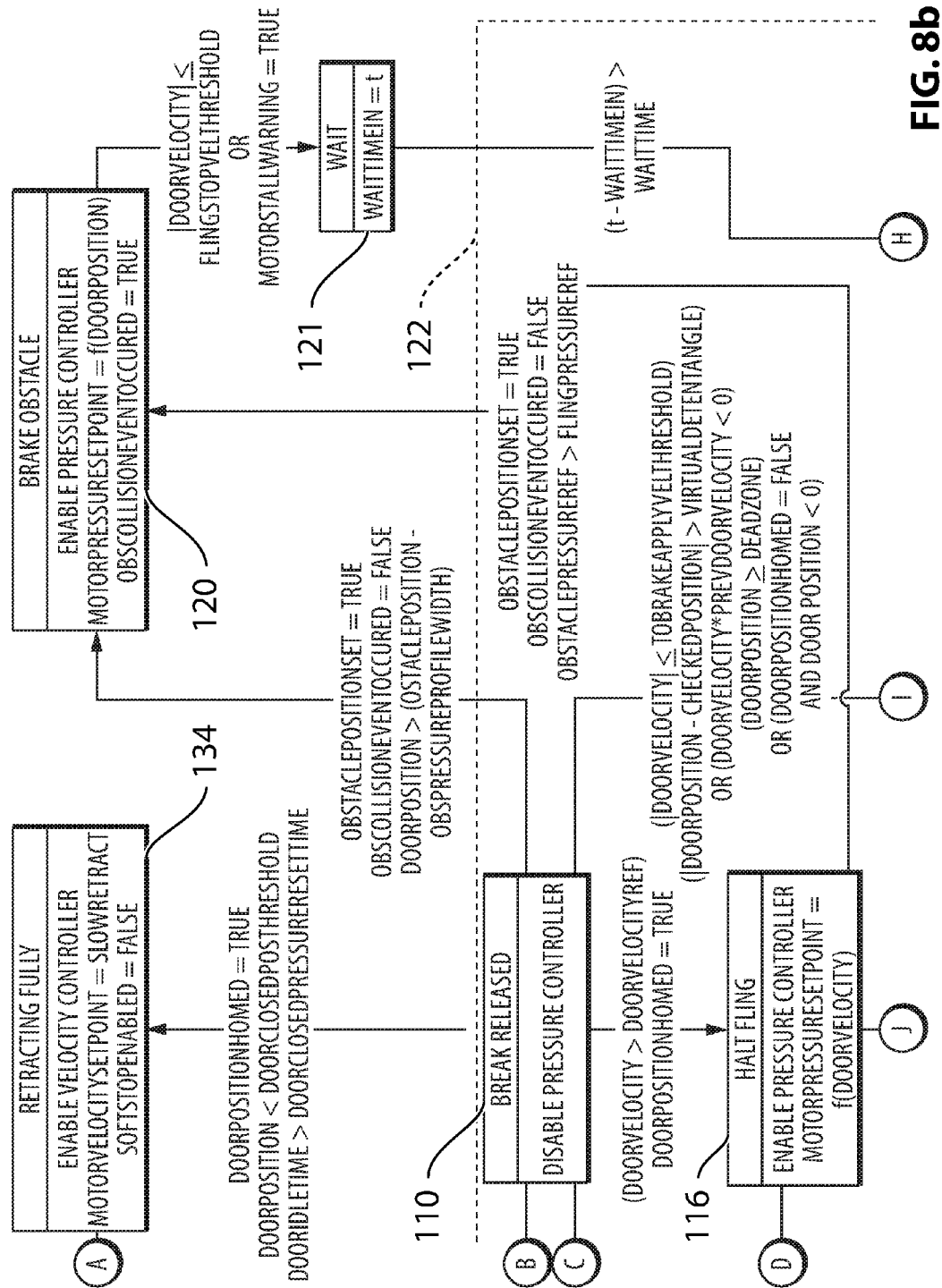
Figure 8C:
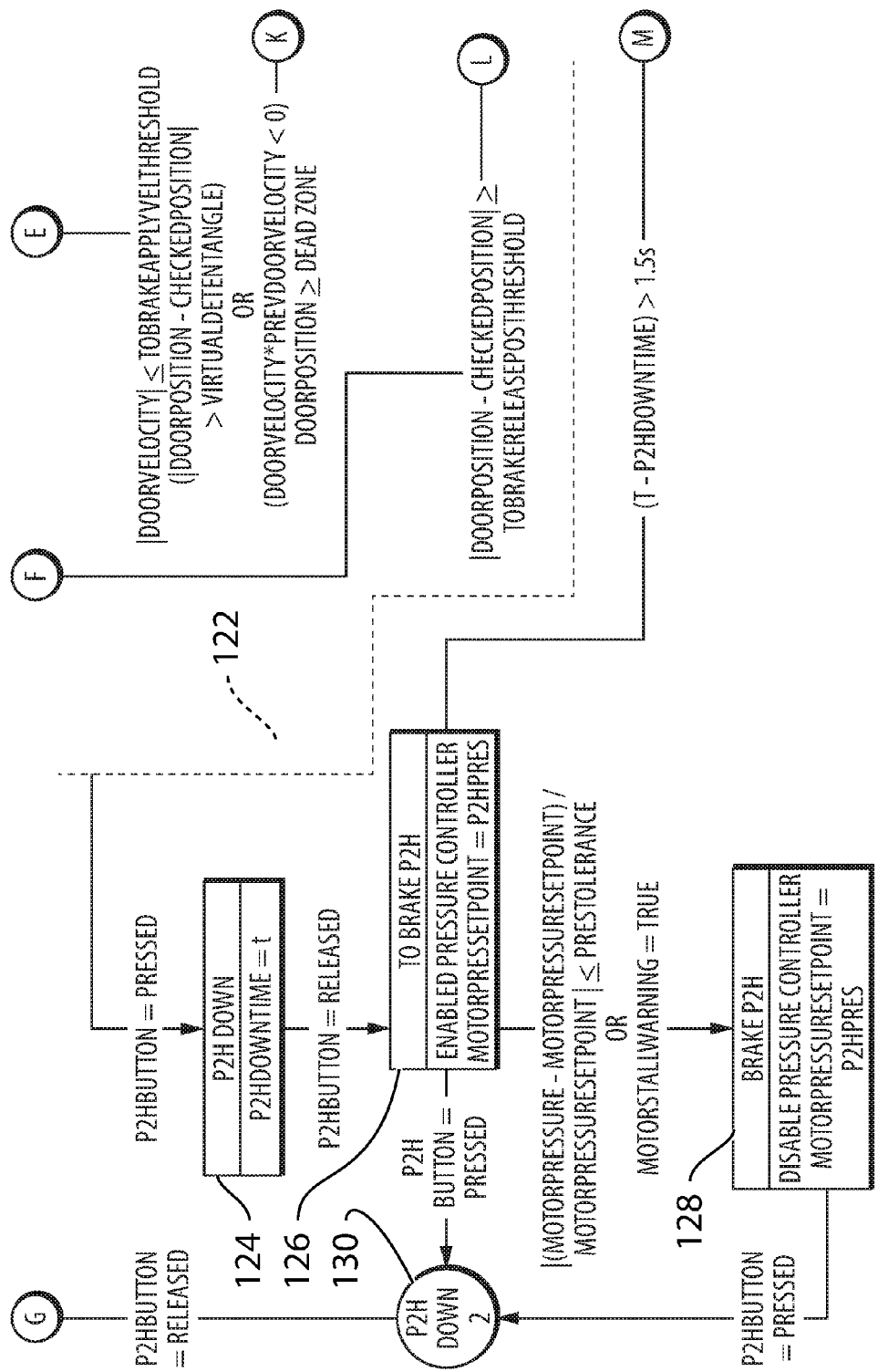
Figure 8D:
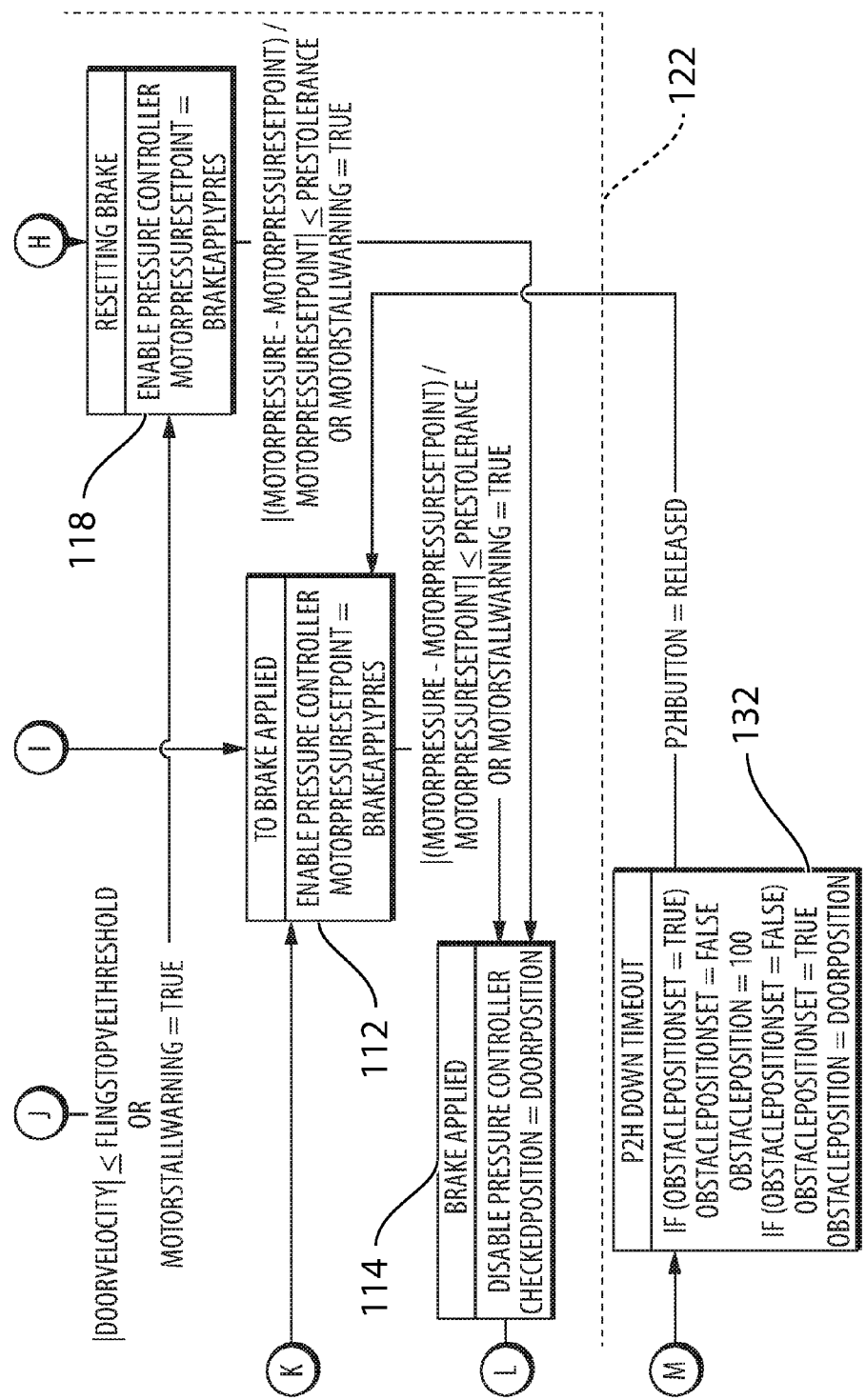

The controller 22 includes a processor 22a and memory 22b, and further includes a plurality of inputs and outputs for receiving signals from the sensors and/or from the vehicle's data bus. The controller's memory 22b contains code that may be in any suitable form. The programming of the controller 22 is described with reference to the state diagram in FIG. 8. Due to the large number of elements in FIG. 8, it is divided into sections which are reproduced in magnified form in FIGS. 8A-8D. A letter identifier in a circle can be used to connect lines that extend from one figure to another. For example, on the right hand side of FIG. 8A there are four connection lines which have letter identifiers A, B, C and D. These lines connect with four lines which have the same letter identifiers in FIG. 8B.

The controller 22 may enter a 'HOMING BEGIN' state (shown at 100) in which it will proceed through a homing sequence when the door control system 10 determines it is required (e.g. when the door control system 10 receives an indication from the vehicle ECU (not shown) that the door 16 has been unlocked and could be opened imminently). The homing sequence may be as follows. When in the HOMING BEGIN state, if the master piston 39 is in an advanced position (such that limit switch 82 is open or OFF) then the door control system 10 enters a HOMING RETRACT state 102 in which the motor 35 rotates at a slow speed to retract the piston 39 until the piston 39 just causes the limit switch 82 to close or be ON. Once the limit switch 82 closes, the motor 35 then stops and the door control system 10 is in a 'HOMING FINISH' state 104, in which the door control system 10 has completed the homing sequence such that the motor 35 and the master piston 39 are in their home positions. When in the 'HOMING BEGIN' state, if the master piston 39 is in a retracted position (such that limit switch 82 is already closed or ON) then the door control system 10 enters a 'HOMING EXTEND' state 106 in which the motor 35 is rotated at slow speed to extend the piston 39 until the switch 82 opens. At that point the door control system 10 enters the 'HOMING RETRACT' state 102 in which the piston 39 is retracted until the switch 82 closes, at which point the door control system 10 enters the 'HOMING FINISH' state 104 as the motor 35 and the piston 39 are in their home positions. The door control system 10 is now initialized.

The door control system 10 then enters a 'TO BRAKE RELEASED' state 108, wherein the controller 22 sets a target pressure setpoint (motorPressureSetpoint) to a pressure suited to bring the brake pistons 32 and 34 to their retracted positions. The controller 22 drives the motor 35 to retract the piston 39 until either the pressure has reached the target pressure setpoint (or until the controller 22 detects a motor stall condition) at which point the door control system 10 enters the 'BRAKE RELEASED' state 110, at which point the brake pistons 32 and 34 are considered by the controller 22 to be at their retracted positions.

When the door control system 10 is in the 'BRAKE RELEASED' state 110 or the 'TO BRAKE RELEASE' state 108, the controller 22 determines if the user has moved the door to a position at which the brake pistons 32 and 34 should be advanced again so as to hold the door 16. Put another way, the controller 22 determines whether the movement of the door 16 is indicative that the user wishes the door 16 be stopped in its current position. Several different movement cues (conditions) may be sought for this purpose. For example, the controller 22 may determine if the door speed is lower than a selected lower threshold value (i.e. it determines if the door speed is substantially zero), which is indicative that the user has substantially stopped moving the door 16. The controller 22 may also determine if the current door position is more than a selected angular distance from the previously checked (i.e. held) door position, or if the door's movement has changed direction (even if it has not moved more than the selected distance away from the previously checked position). Thus, the controller 22 checks if the door 16 has been moved by more than a selected distance and is now substantially stopped, or if the door 16 has been moved by any distance and has now changed direction in its movement (and is substantially stopped). Both of these are relatively reliable indicators that the user has actually moved the door to a new position and wants the door 16 stopped in its current position.

The controller 22 may also determine if the door position is outside of a dead zone. The dead zone is a zone that extends from the closed position outward by a selected amount (e.g. about 10 degrees), in which the controller 22 is programmed to prevent the door 16 from being checked. This is, in part, because such a small amount of opening would not be useful for many purposes and so it is not considered a range in which the user is likely to want to keep the door 16 checked. Additionally, this prevents the door 16 from being in a position wherein the user has to accelerate the door 16 sufficiently to overcome the door seal force and fully latch the door 16, from a checked position that is only a few degrees away from the fully closed position. These conditions are intended to assist the controller 22 in determining when the user has moved the door 16 to their desired position and to permit the controller 22 to automatically stop the door 16 there. If these conditions are met, the door control system 10 enters the 'TO BRAKE APPLIED' state 112 in which the controller 22 sets the pressure setpoint to a pressure at which a holding force (also referred to as a check force) is applied by the brake pistons 32 and 34 so as to hold the door 16 in a desired position. Upon receiving an indication that the pressure has reached the setpoint (or that the motor 35 has stalled), the door control system 10 enters the 'BRAKE APPLIED' state 114 at which point the controller 22 considers the brake pistons 32 and 34 to be in their advanced positions so as to hold the door 16 in its current position.

It will be noted that, when the door control system 10 is in the 'BRAKE APPLIED' state 114, the brake force applied by the brake pistons 32 and 34 can be maintained on the check arm 18 without any power consumption by the motor 35. This is due at least in part to the use of at least one element that cannot be back driven in the drive train between the motor 35 and the master piston 39. This element may be the leadscrew 38, for example, that cannot be back driven by a force on the master piston 39 urging the master piston 39 to retract. As a result, the door 16 can be held in an open position for an extended period of time without draining the vehicle's battery. Additionally, this means that the operation of the system 10 consumes relatively little energy. While the leadscrew 38 may be the element that is non-back drivable, other elements in the drive train could alternatively or additionally be non-back drivable. For example, in an embodiment wherein a worm and worm wheel replace the gears 36 and 37, the worm may be configured to be non-back drivable.

When in the state 114, the controller 22 determines if the user has moved the door 16 (by determining if the user has overcome the holding force of the brake pistons 32 and 34 and has moved the door 16 by more than a selected, relatively small distance) at which point the door control system 10 returns to the 'TO BRAKE RELEASED' state 108, at which point the controller 22 sets a pressure setpoint intended to bring the pistons 32 and 34 to their retracted positions. The holding force selected to be used by the brake pistons 32 and 34 may be selected to be sufficiently high to reliably hold the door 16 in the desired position, but to be sufficiently low so that it can be overcome without undue exertion by the vehicle user.

It will be noted that, because of the position of the brake pistons 32 and 34 relative to the door pivot axis $A_D$ (FIG. 1), the moment arm of the braking force applied by the brake pistons 32 and 34 on the check arm 18 relative to the door pivot axis $A_D$ (FIG. 1) varies based on the position of the door 16. As a result, if the pistons 32 and 34 apply the same holding force on the check arm 18 when the door 16 is in two different positions, two different initiation forces will be needed to overcome the holding force in order to initiate movement of the door 16 from those positions. To ensure that the user has a consistent feel when moving the door 16 away from a checked position, the controller 22 may be programmed to automatically adjust the holding force of the brake pistons 32 and 34 based on the door position (i.e. based on the moment arm present between the point of application of the holding force by the pistons 32 and 34 and the door pivot axis $A_D$), so that the force that must be applied by the user to overcome the holding force remains substantially the same at all positions of the door 16.

In some embodiments the controller 22 may be capable of detecting the angle of inclination of the vehicle 12 (or more particularly, the door 16), about both a longitudinal axis $A_{LONG}$ (FIG. 1) and a lateral axis $A_{LAT}$ for the vehicle 12. For example, the controller 22 may receive signals from the door accelerometer 66 for the purpose of measuring the angle of inclination of the door 16. The angle of inclination of the door 16 impacts the amount of force that is needed to hold the door 16 in a given position (i.e. the holding force necessary to keep the door 16 held in a given position). Thus by determining the angle of inclination of the door 16, the controller 22 can compensate for it and adjust the holding force applied to the check arm 18. Instead of using signals from the door accelerometer 66, a separate accelerometer could be provided for the purpose of providing angle of inclination data to the controller 22. For example, the controller 22 may receive signals from an accelerometer that is already present on the vehicle 12, via a vehicle ECU through a vehicle data bus.

While the door 16 is in the 'BRAKE RELEASED' state 110, the resistance of the door 16 to movement depends on the position of the pistons 32 and 34 when they are retracted. The resistance selector dial 86 may be movable to adjust the position of the pistons 32 and 34 when retracted, which adjusts the force of the pistons 32 and 34 on the check arm 18 when retracted. This permits a user to select the amount of resistance that will be applied to the door 16 during movement from one position to another. The resistance may be adjusted by the user so as to match the resistance associated with other vehicles they have driven, so as to permit easy movement of the door 16 based their level of strength or other factors.

Additionally, it may be possible in some embodiments to provide an initiation force selector dial (shown at 87 in FIG. 1) to permit a user to select the amount of force required to initiate retraction of the brake pistons 32 and 34 (i.e. the amount of force required to overcome the check force of the pistons 32 and 34 when the door control system 10 is in the 'BRAKE APPLIED' state 114). On a typical door of the prior art that has a check arm with detents and a spring-biased ball or the like that engages one of the detents to hold the door 16 in a particular position, the initiation force would be the force required to bring the ball out of the detent it is engaged with.

Providing one or both selector dials 86 and 87 permits a user some control over the 'feel' of the door 16. Providing both dials 86 and 87 permits the door control system 10 to be adjusted to match the feel of any door on any vehicle or to provide the user with any selected door movement experience. For example, the resistance can be adjusted so as to mimic a door having a selected weight, and the check force can be adjusted so as to mimic the check force associated with a particular arrangement of detent and spring-biased ball.

It will further be noted that, even in embodiments wherein the user is not provided with selector dials 86 and 87, the company that installs the door control system 10 in a vehicle can program the controller 22 to apply a selected check force in the 'BRAKE APPLIED' state 114 and a selected resistance force during movement of the door 16 when in the 'BRAKE RELEASED' state 110 thereby permitting the company to use the same door control system 10 in a multitude of different vehicle models and provide each with unique door movement characteristics.

Instead of selector dials 86 and 87, the door control system 10 can be provided with an interface that permits a greater degree of control over the feel of the system 10. For example, the user may control the feel of the system 10 via a touch screen (shown in FIG. 1 at 99). With reference to FIG. 8E, the touch screen 99 may permit both the user to select one or more of such parameters as the initiation force (shown at 97a in FIG. 8E) needed to initiate retraction of the brake pistons 32 and 34 (i.e. to initiate entry of the controller 22 into the 'TO BRAKE RELEASED' state 108), the quickness of the ramp down (shown at 97b) of the resistive force of the system 10 from the initiation force to a base resistive force (shown at 97c), the magnitude of the resistive force 97c and the quickness of the ramp up (shown at 97d) from the base resistive force 97c to the check force. The check force is substantially the same as the initiation force 97a, since it is the check force that the user overcomes with the initiation force in order to indicate to the controller 22 to retract the brake pistons 32 and 34.

While in FIG. 8E, the curves 97b, 97c and 97d are shown as being linear, however, each of these curves may be curvilinear in any suitable way.

In embodiments wherein the door 16 must move through a selected (relatively small) distance in order for the controller 22 to enter the 'TO BRAKE RELEASED' state 108, there is still an initiation force that the user must overcome in order to cause retraction of the brake pistons 32 and 34, and so the description above regarding control over the initiation force (and other parameters) remains applicable in such embodiments.

When in the 'TO BRAKE RELEASED' state 108 or the 'BRAKE RELEASED' state 110, the controller 22 is programmed to detect whether the door speed exceeds a maximum permissible door speed so as to prevent the door 16 from overstressing the mechanical element that limits its travel too forcefully, particularly in the opening direction (e.g. limit member 33). However, while the maximum permissible door speed may be set to a suitably low speed when the door 16 is near the end of its travel in the opening direction, the maximum permissible door speed may be relatively high when the door 16 is far from the end of its travel so as not to unnecessarily impede the vehicle user from opening the door 16 in an expeditious manner. Furthermore, the maximum permissible door speed when the door 16 is being closed and is near the end of its travel in the closing direction (i.e. when it is near the closed position) may be higher than the maximum permissible door speed when the door 16 is being opened and is near the end of its travel in the opening direction. This is because there is a danger of damaging the door control system 10, the hinges 17 and even the body 14 of the vehicle 12 if the door 16 is flung open with too much force and hits the end of its travel too forcefully, whereas there is no danger of damaging these components when the door 16 is closed too forcefully. Furthermore, during door closing some speed is beneficial to assist the door 16 in compressing the door seals and fully latching the striker (not shown) that is on the vehicle body 14, and so the controller 22 will cause the closing door speed to be reduced to a level wherein the door 16 still has sufficient speed to overcome the door seals and fully latch the striker. Thus, as can be seen, the controller 22 may select different maximum permissible door speed depending on different factors.

If the door speed does exceed a maximum permissible door speed the controller 22 considers this to be a possible indicator that the wind has caused the door 16 to be flung and the door control system 10 enters the 'HALT FLING' state 116. In state 116 the controller 22 determines a desired fluid pressure (so as to apply a selected braking force) so as to bring the door speed down below a selected speed threshold value. The braking force applied may be a function of the door speed. For example, the controller 22 may apply a higher braking force if the door speed is higher and a lower braking force if the door speed is lower. While applying the braking force, if the controller 22 determines that the door speed has dropped below the selected speed threshold value (or that the motor 35 has stalled), the door control system 10 enters a 'RESETTING BRAKE' state 118 which may be essentially the same as the 'TO BRAKE APPLIED' state 112 and in which the braking force is adjusted to the holding force so as to hold the door 16 at its current position. In some embodiments, there is no 'RESETTING BRAKE' state 118 and any conditions that would have led to that state would instead lead to the 'TO BRAKE APPLIED' state 112. Upon a determination that the fluid pressure has reached the selected pressure so that the brake pistons 32 and 34 apply the holding force (or that the motor 35 has stalled), the door control system 10 enters the 'BRAKE APPLIED' state 114.

The maximum permissible door speed may follow the graph shown in FIG. 9A. As can be seen the maximum permissible door speed may follow curve 201 wherein it decreases linearly from a maximum permissible initial door speed to zero at a maximum open position shown at 211. The maximum open position is the maximum permissible open position for the door 16. It may be the position of the door 16 when it has reached the end of its travel as limited by the limit member 33 on the check arm 18. The door control system 10 may be configured to permit a vehicle user to select a different maximum open position, however, examples of which are shown at 212 and 213 in FIG. 9A, as will be discussed in further detail below. In such instances the door control system 10 may automatically adjust the curve representing the maximum permissible door speed to reach zero at the maximum open position. Examples of such adjusted curves are shown at 202 and 203 in FIG. 9A. While the maximum permissible door speed may decrease from any given initial position until the maximum open position, it is alternatively possible for the controller 22 to limit the maximum permissible door speed differently. For example, as shown in FIG. 9B, over some of the travel of the door 16 (represented by curve portion 204a) the maximum permissible speed of the door 16 is a constant value. At some distance from the maximum open position shown at 214, as represented by curve segment 204b, the maximum permissible door speed is reduced linearly to zero at the point where the door 16 reaches the maximum open position 214. FIGS. 9C and 9D illustrate alternative controller speed limit curves shown at 205 and 206 respectively that could by applied to the door movement. As can be seen, for example, in FIG. 9C, curve 205 decreases in a non-linear way from an initial position to the maximum open position. In FIG. 9D, curve 206 increases as the door 16 moves away from an initial position, reaching a maximum shown at 226, after which the curve decreases towards the maximum open position shown at 216. Thus, as can be seen, the controller 22 may limit the maximum speed of the door 16 non-linearly in any suitable way.

In some embodiments, the touch screen 99 can be used to control the maximum permissible door speed imposed by the controller 22 during movement of the door 16 towards either an obstacle, towards the maximum open position and/or towards the closed position. The touch screen 99 may be used to permit the user to adjust and reshape the curve in any suitable way.

In some embodiments, the controller 22 may permit the use of one or more 'virtual detents'. For example, the controller 22 may permit a user to select positions for the virtual detents. The detents may be points along the range of movement of the door 16 where the resistive force drops and then increases briefly so as to urge the door 16 to be stopped by the user in one of the detent positions, and also to mimic the feel of a typical prior art door with a check arm with detents.

In some embodiments, the settings related to the feel of the door (e.g. the initiation force, the resistive force during movement of the door, the profile of the relationship between a resistive force applied to the check arm during movement of the door and the position of the door, the maximum permissible door speed, the maximum open position, the position(s) of any virtual detents) for a particular user may differ from the settings for another user. The settings for each user may be stored in memory in the controller 22 or in some other ECU in the vehicle 12, and may be retrieved and used when a particular user identifies him/herself to the controller 22 or other ECU. The identification of the user may be carried out remotely via the user's key fob (shown in at 95a in FIG. 1), or via entry of a user-associated code on the touch screen 99 or via any other suitable means. Thus, when a user uses their key fob 95a to remotely unlock the door 16, the controller 16 may be programmed to apply the settings for that user to the door's movement. Another user's key fob is shown at 95b in FIG. 1, and is used to identify a second user to the vehicle 12 so that when the second user unlocks the door 16 remotely with the key fob 95b, the controller 22 applies the settings for the second user to the door's movement.

It will be understood that if the touch screen 99 is included in the vehicle 12, then it would be possible to omit the selector dials 86 and 87 without losing functionality. The selector dials 86 and 87 and the touch screen 99 are only examples of human machine interfaces that could be used. Any other suitable type of interface could alternatively or additionally be used.

It will be noted that, by setting a target fluid pressure for the door control system 10 instead of setting a target position for the brake pistons 32 and 34, the brake pistons 32 and 34 move to whatever position they need to in order to apply a selected force on the check arm 18. Thus, wear of the brake pads 40 and 42 is automatically compensated for.

Figure 10C:
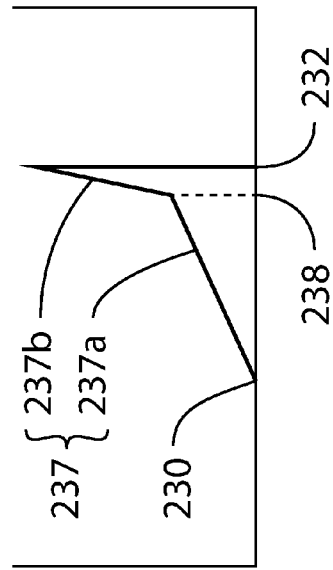
FIG. 10C is a graph illustrating an example relationship between fluid pressure in the check arm holder and door position in relation to a detected obstacle at a specific door velocity.
Figure 10A:
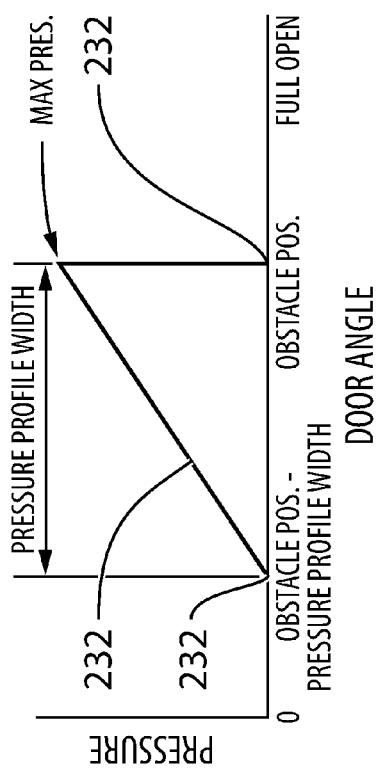
FIG. 10A is a graph illustrating an example relationship between fluid pressure in the check arm holder and door position in relation to a detected obstacle.

Referring to FIGS. 8A-8D, if the door control system 10 is in the 'BRAKE RELEASED' state 110 and the controller 22 determines that there is an obstacle in the path of the door 16 and that the door 16 is within a selected distance from the obstacle, then the door control system 10 enters a 'BRAKE OBSTACLE' state 120, wherein the motor 35 is operated to drive the fluid pressure to a selected pressure that is based on the position of the door 16. For example, if the obstacle is determined to be very close to the door 16, the fluid pressure is selected to be very high to brake the door 16 quickly. In general the profile describing the relationship between the fluid pressure selected and the distance between the door 16 and the obstacle may be a wedge, as shown in FIG. 10A. As shown in FIG. 10A, the controller 22 applies no fluid pressure (or whatever fluid pressure is applied at the retracted state of the pistons 32 and 34) until the door 16 is determined to be within a selected distance (referred to in FIG. 10A as the 'pressureProfileWidth') from the obstacle. During movement of the door 16 by the user, when the door 16 moves past a first selected position 230 which is within the selected distance of the obstacle, the controller 22 applies a progressively increasing amount of fluid pressure on the brake pistons 32 and 34 so as to progressively increase the resistive force, based on the proximity of the door 16 to the obstacle. In the embodiment shown in FIG.

10A, the progressively increasing amount of fluid pressure reaches a maximum when the door 16 reaches a second selected position 232, which may be the position of the obstacle, or which may be, for example, a selected position that is near the obstacle but not at the obstacle (i.e. that is a second selected distance from the obstacle) and remains at the maximum fluid pressure for any further movement of the door 16 towards the obstacle. The curve representing the resistive force applied relative to door position is shown at 231. While FIG. 10A lists 'Pressure' as being shown on the Y-axis of the curve 231, it will be understood that the resistive force is directly related to the fluid pressure and so the curve 231 represents both the relationship of the fluid pressure that the controller 22 applies to the brake members 32 and 34 in relation to door position, and the relationship of the resistive force that the controller 22 drives the brake members 32 and 34 to apply on the check arm 18 in relation to door position.

Figure 10B:
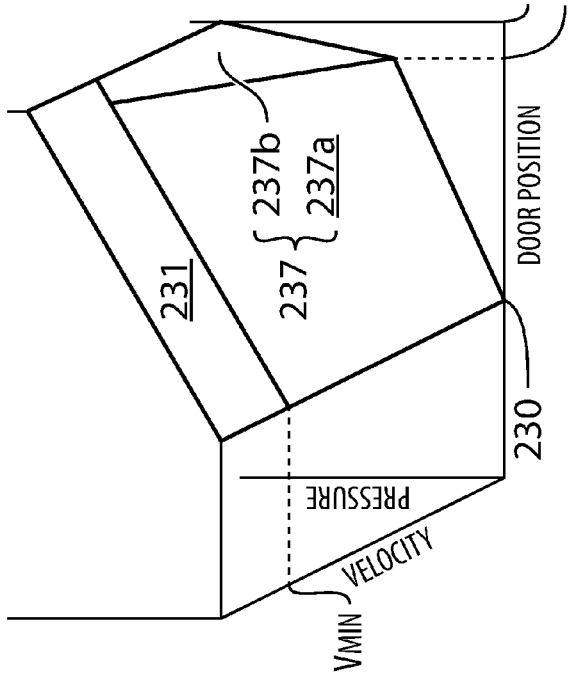
FIG. 10B is a three-dimensional graph that shows a more complex relationship between fluid pressure in the check arm holder and door position in relation to a detected obstacle that also accounts for door velocity.

In the embodiment shown in FIG. 10A, the resistive force applied by the brake pistons 32 and 34 increases according to a selected profile (in this case a linear profile) from a door position 230 which is a selected distance from the obstacle to a door position 232 which may be at or very near the obstacle. This profile (represented by curve 231) may differ depending on certain factors such as the velocity of the door 16. For example, the resistive force may vary according to the three-dimensional graph shown in FIG. 10B. As shown in FIG. 10B for velocities that exceed a selected velocity (shown in the graph as $V_{MIN}$), the resistive force may follow the profile 231, as shown in FIG. 10A. For velocities that are less than $V_{MIN}$ however, the resistive force may increase more slowly according to a curve portion 237a, until the door 16 is at a certain distance from the obstacle, represented by door position 238, at which point the resistive force follows curve portion 237b wherein it ramps up to the maximum resistive force by the time the door 16 reaches position 232. The two curve portions 237a and 237b together make up a curve 237. The position 238 at which the transition occurs may be relatively close to the position 232. In other words, the door 16 is within the selected distance of the obstacle and has a velocity that is less than $V_{MIN}$, as the door 16 moves slower, the resistive force applied by the system 10 at any given distance from the obstacle decreases. An example of the curve 237 for a given door velocity is shown in FIG. 10C.

Referring to FIG. 8, if the door control system 10 is in the 'HALT FLING' state 116 however and the fluid pressure selected to avoid a collision with the obstacle would be lower than that already being used to slow down the door then the door control system 10 does not enter the 'BRAKE OBSTACLE' state 120.

When the door speed drops sufficiently (or if the motor 35 stalls) while in the 'BRAKE OBSTACLE' state 120, the door control system 10 may wait a selected period of time (as shown in WAIT state 121) and then may enter the 'RESETTING BRAKE' state 118 whereupon the pressure is selected to provide the holding force to hold the door 16 stationary.

The obstacle detection capability, particularly during opening of the door 16 wherein the door control system 10 employs the obstacle detection sensor 68, permits the door control system 10 to prevent the door 16 from colliding with an adjacent vehicle in a parking lot, from colliding with a lamp post, from colliding with a transient obstacle such as a pedestrian, or a child or pet that the vehicle user may not notice while in the vehicle or from any other obstacle. The obstacle detection capability of the controller 22 during a door opening action may be disabled when the user is attempting to open the door 16 from outside of the vehicle (which may be detected by activation of the outside door handle). This is because there is at least some likelihood that the user him/herself would be detected by the sensor 68 and considered an obstacle. Thus, the obstacle detection capability of the controller 22 during door opening may be enabled only when the controller 22 detects that the inside door handle is activated, indicating that the door 16 is being opened by a vehicle user that is inside the vehicle 12.

The door control system 10 optionally includes a 'press-to-hold' feature that permits the user to cause the door control system 10 hold the door 16 at any given selected position. The feature is shown in the state diagram as follows. At any time during the main operation of the door 16 (denoted by the dashed box outline shown at 122) the user can press the 'push-to-hold' button 84, at which point the door control system 10 enters the 'P2H DOWN' state 124. If the user releases the P2H button 84 within a short time, for example, less than 1.5 seconds, the door control system 10 enters a 'TO BRAKE P2H' state 126 wherein the fluid pressure is set to a selected locking pressure, which may apply a selected locking force to hold the door 16 in the selected position. The locking force may optionally be higher than the holding force normally applied in the 'TO BRAKE APPLIED' and 'BRAKE APPLIED' states 112 and 114. When the door control system 10 detects that the fluid pressure has reached the selected locking pressure or that the motor 35 has stalled, the door control system 10 enters the 'BRAKE P2H' state shown at 128 wherein pressure is maintained at the selected locking pressure. In some embodiments, the locking pressure may be the pressure achieved by driving the motor 35 until it stalls, and may thus be the maximum pressure available by the check arm holder 20 so that the position-locking force applied by the check arm holder 20 is the maximum force it can generate. In such embodiments it will be understood that the position of the pistons 32 and 34 will be even more advanced than the check position in which the pistons 32 and 34 apply the check force. The position of the pistons 32 and 34 when in the 'BRAKE P2H' state 128 may be referred to as a locking position.

If the user wishes to stop holding the door 16 using the press-to-hold feature, the user can press and release the P2H button 84 again while in the 'TO BRAKE P2H' or 'BRAKE P2H' states 126 or 128, at which point the door control system 10 can exit the 'press-to-hold' feature and can return to the 'TO BRAKE RELEASED' state 108, on the assumption that the user wishes to move the door 16 to a new position (e.g. to close the door 16). The exiting of the press-to-hold feature is shown in the state diagram at a 'P2H DOWN 2' state 130.

In some embodiments, when the door control system 10 is in the 'BRAKE P2H' state 126, it will be noted that the door 16 does not release (retract the brake pistons 32 and 34) simply by a user exerting a force on the door 16, even if that force overcomes the holding force applied by the check arm holder 20. In other words, even if the user overcomes the holding force of the door 16 when in the state 126, the controller 22 does not retract the pistons 32 and 34; it continues to apply the holding force. The only way to release the door 16 from the holding force is to press the P2H button 84. As a result, the door 16 will not open further in the event that the user inadvertently knocks against it while carrying out some activity (e.g. exiting the vehicle 12, retrieving groceries or objects from the vehicle 12).

When in the 'P2H DOWN' state 124, if the user holds the P2H button 84 down for longer than a selected time (e.g. longer than 1.5 seconds), the controller 22 may be programmed to treat this as an indication that there is an obstacle detected while at the current door position such that the door 16 will be prevented from opening beyond the current position afterwards. This is represented by 'P2H DOWN TIMEOUT' state 132. This state 132 permits the user to set a reduced maximum open position for the door 16. This door position may be stored by the controller 16 on a 'permanent' basis (i.e. until the user programs a new maximum open position), or on a temporary basis (e.g. a one-time use), after which the controller 22 returns to using the mechanical maximum open position (defined by the presence of the limit member 33 on the check arm 18).

When the controller 22 detects that the user has closed the door 16, the door control system 10 enters the 'RETRACTING FULLY' state 134 in which the controller 22 drives the motor 35 to retract the master piston 39 slowly until the limit switch 82 is closed (i.e. to the master piston's home position), at which point the door control system 10 enters the 'DOOR CLOSED' state 136. When the master piston 39 is in the home position, the brake pistons 32 and 34 are fully retracted and do not apply any resistive force on the check arm 18. As a result, the check arm holder 20 is configured to apply no resistive force on the door 16 when the user tries to open the door 16. This serves as a safety measure to ensure that there is as little resistance as possible for the user to open the door to exit the vehicle after a crash event or in some other emergency situation. Additionally, the controller 22 may be programmed to ensure that the brake pistons 32 and 34 remain in their fully retracted positions throughout movement of the door 16 in the dead zone region of the door's range of travel. Alternatively, the controller 22 may provide some resistive force on the check arm 18 throughout movement in the dead zone, however, the resistive force may be different (e.g. smaller) than the resistive force exerted when the controller 22 is in the 'BRAKE RELEASED' state 112.

If the user opens the door 16 and moves it from the closed position outwards past the dead zone, the door control system 10 enters the 'TO BRAKE RELEASED' state 110.

Figure 12:
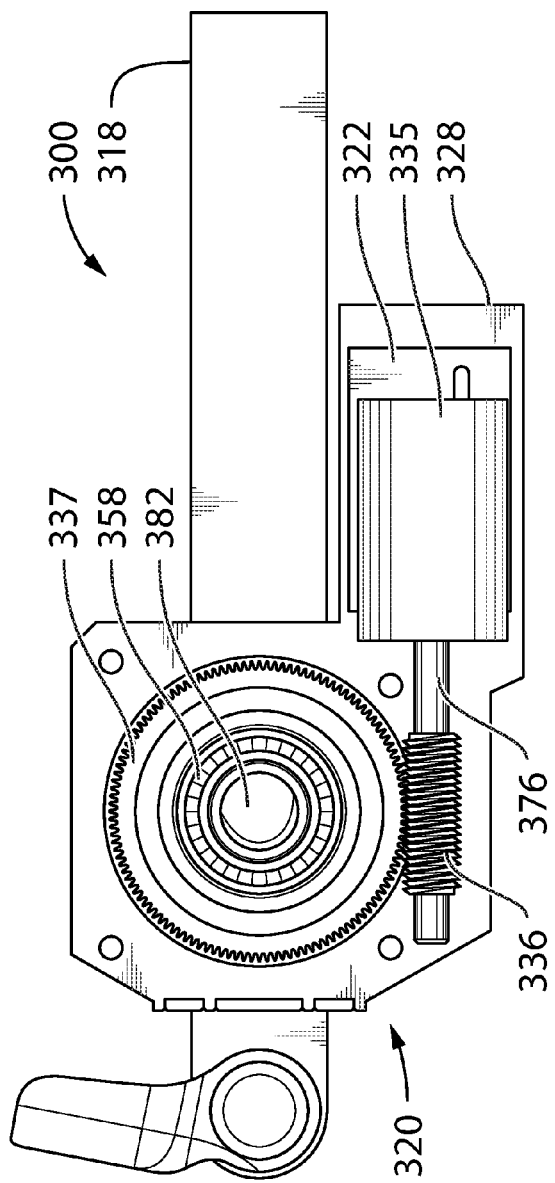
FIG. 12 is a plan view of an alternative door control system including a check arm and a check arm holder.
Figure 13:
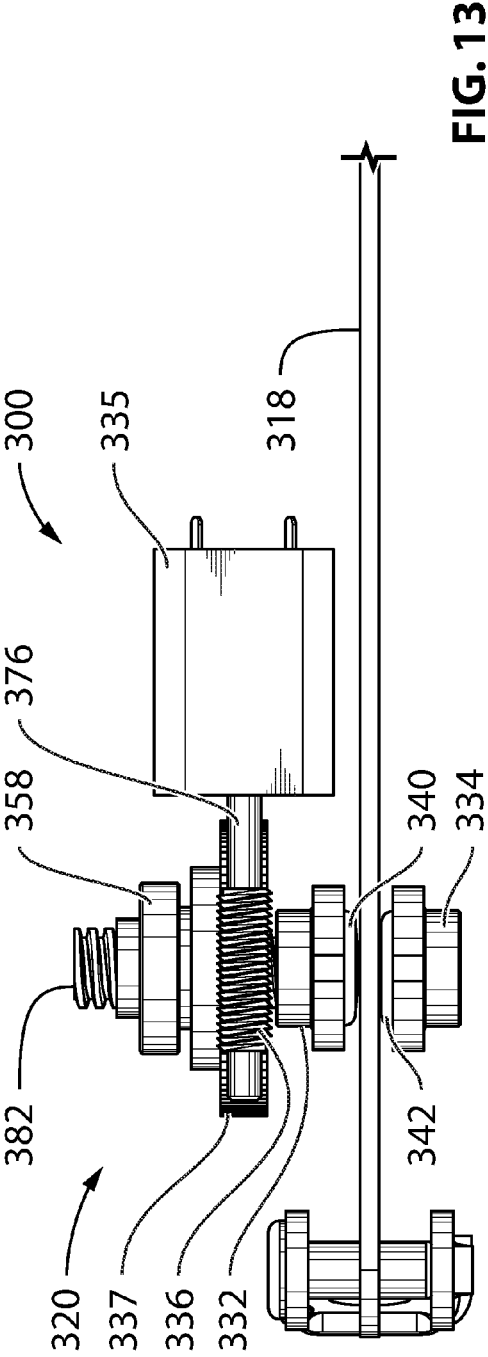
FIG. 13 is a side view of the door control system shown in FIG. 12 without a housing.
Figure 14A:
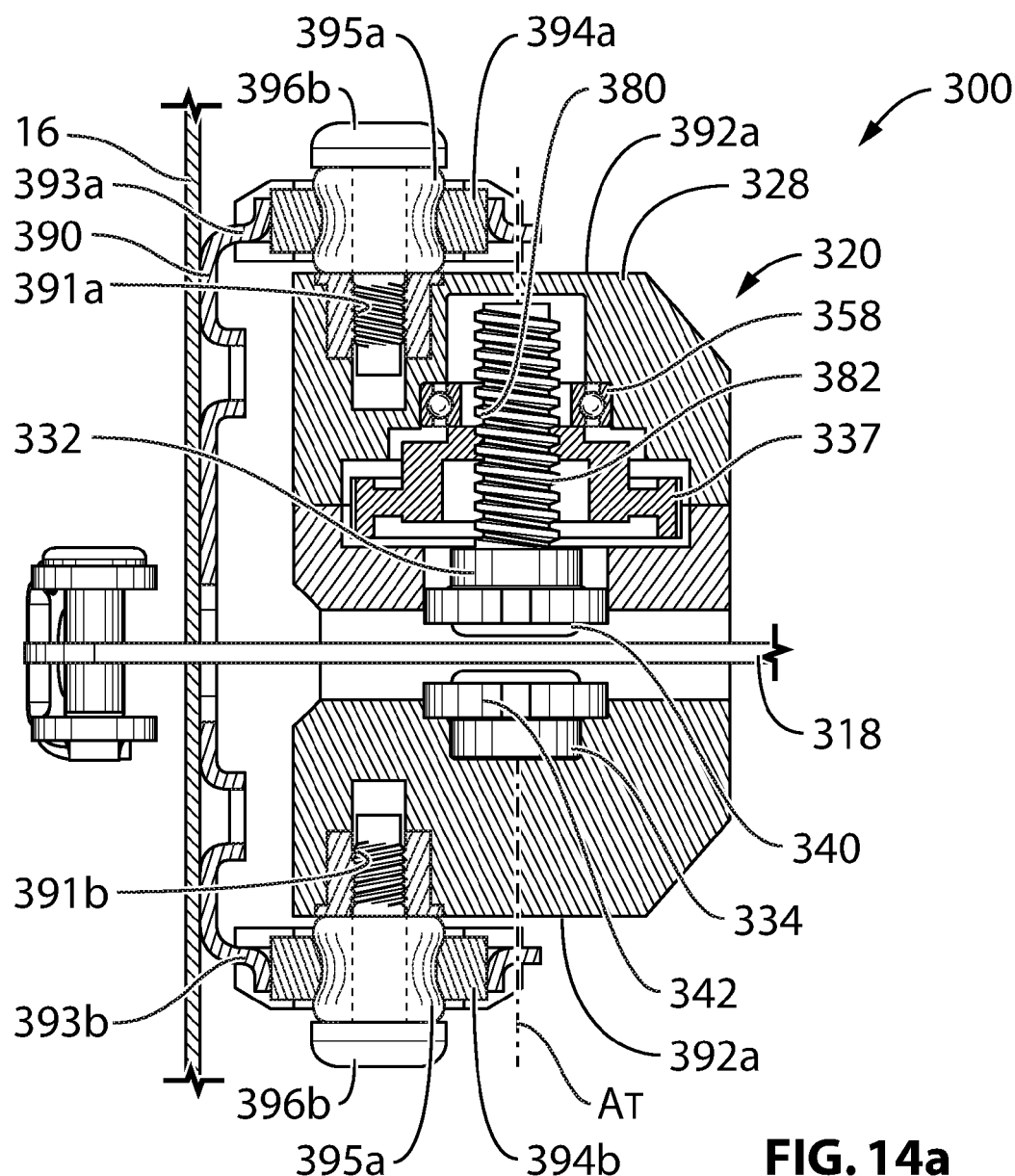
FIGS. 14A and 14B are sectional side views of the door control system shown in FIG. 12, with brake members in retracted and advanced states respectively.
Figure 14B:
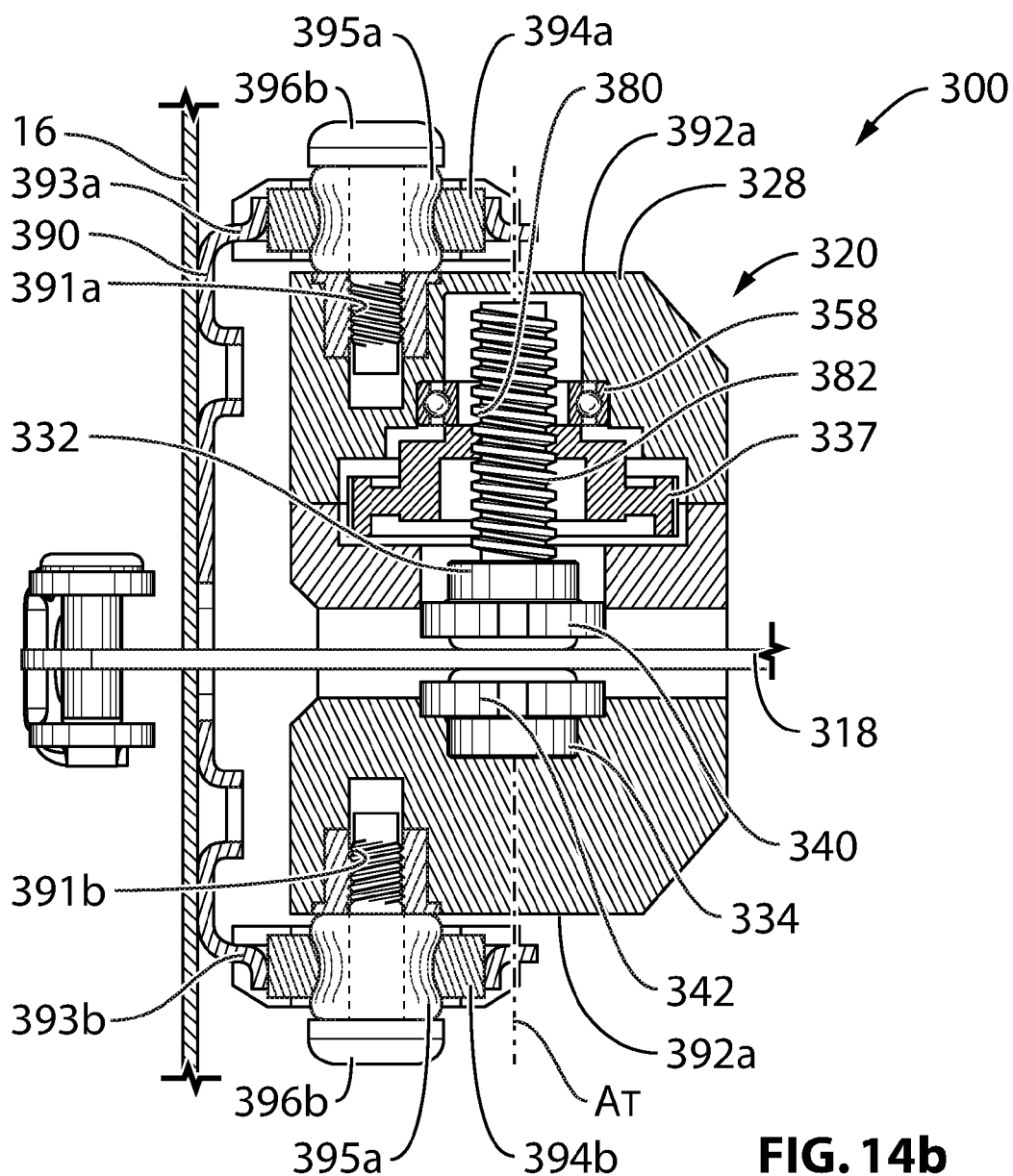

Reference is made to FIGS. 12-14b, which show a door control system 300 in accordance with another embodiment of the present disclosure. FIGS. 14A and 14B show the door control system with brake members (shown at 332 and 334) in retracted and advanced states respectively. It will be noted that the illustrations of these states in FIGS. 14A and 14B are, for the sake of clarity, greatly exaggerated in the apparent amount of travel needed to move from one state to the other. In many vehicular applications the amount of travel of the brake members 332 and 334 may be quite small, less than 1 mm in some instances.

The door control system 300 includes a check arm 318 (which may be similar to the check arm 18) and a check arm holder 320 that includes a housing 328, a motor 335 that drives a worm gear 336, which drives a worm wheel 337. The worm wheel 337 contains an internal thread 380 (FIGS. 14A and 14B), which engages an externally threaded traveler, shown at 382, that is constrained to travel linearly in the housing 320 (e.g. by a flat surface on the traveler 382 that engages a flat surface in the housing 320, or by any other suitable means). The worm wheel 337 may be supported for rotation by a bearing 358 which may be a thrust bearing in order to manage thrust loads incurred by the traveler 382 from the first brake member 332.

Rotation of the worm wheel 337 in a first worm wheel direction causes linear movement of the traveler 382 in a first traveler direction, which drives a first brake member 332 with a first brake pad 340 thereon and a second brake member 334 with a second brake pad 342 thereon towards an advanced position, shown in FIG. 14B. When in the advanced position the first and second brake members 332 and 334 apply a holding force on the check arm 318. Rotation of the worm wheel 337 in a second worm wheel direction causes linear movement of the traveler 382 in a second traveler direction, which drives the first and second brake members 332 away from each other towards a retracted position, shown in FIG. 14A.

In order to be able to use a single traveler 382 connected to a single brake member 332, while still carrying out movement of both brake members 332 and 334 between the advanced and retracted positions, the check arm holder 320 itself may be configured to be movable transversely (i.e. along transverse axis $A_T$ shown in FIGS. 14A and 14B) relative to the vehicle door 16. In the embodiment shown in FIGS. 14A and 14B, the check arm holder 320 is movably mounted to the mounting bracket 390 and the mounting bracket 390 is fixedly mounted to the vehicle door 16. The housing 328 includes first and second internally threaded apertures 391a and 391b situated at first and second transverse endwalls 392a and 392b of the housing 328. The mounting bracket 390 includes first and second ears 393a and 393b, which face the first and second transverse endwalls 392a and 392b of the housing 328. Resiliently flexible connectors 394a and 394b (which may also be referred to as resilient connectors 394a and 394b) are positioned substantially fixedly in apertures in the ears 393a and 393b respectively. The resiliently flexible connectors may be made from any suitable material such as a natural or synthetic elastomeric material, such as for example a suitable rubber. Bushings 395a and 395b may be held in apertures in the connectors 394a and 394b respectively. A suitable shape may be provided at their interface to inhibit withdrawal of the bushings 395a and 395b from the connectors 394a and 394b. Shoulder bolts shown at 396a and 396b may pass through apertures 397 in the bushings 395a and 395b and into the threaded apertures 391a and 391b, such that a bearing portion 398 on each bolt 396a and 396b is supported rotationally in one of the apertures 397. This arrangement permits rotational movement of the check arm holder 320 relative to the mounting bracket 390, which permits the check arm holder 320 to pivot as needed to accommodate the check arm as it moves to and fro through the check arm holder 320 during swinging of the door 16 in one or another direction. In addition, the flexible connectors 394a and 394b permit transverse movement of the check arm holder 320 relative to the mounting bracket 390. More specifically, the flexible connectors 394a and 394b can deform elastically as needed to permit the transverse movement (FIG. 14B), and can then return to their original shape (FIG. 14A).

Movement of the brake members 332 and 334 from a retracted position shown in FIG. 14A to the advanced position shown in FIG. 14B is as follows: The motor 335 rotates so as to advance the first brake member 332 towards the check arm 318. When the first brake member 332 is initially brought into engagement with the check arm 318, the second brake member 334, which is not powered directly by the traveler 382, remains spaced from the check arm 318, in the retracted position. As the motor 335 continues to drive the traveler 382 however, the first brake member 332 will remain stationary, in abutment with the check arm 318, and the rotation of the gear 337 will drive the rest of the check arm holder 320 transversely (upwards in the views shown in FIGS. 14A and 14B) until the second brake member 334 engages the check arm 318 so that a holding force is applied by both brake members 332 and 334 as shown in FIG. 14B. The transverse movement of the check arm holder 320 is permitted by the resilient connectors 394A and 394B. Upon rotation of the motor 335 to drive the traveler 382 in the second direction, the first brake member 332 remains stationary and engaged with the check arm 318, while the rest of the check holder 320 lowers to bring the second brake member 334 out of engagement with the check arm 318. Once the rest of the check arm holder 320 reaches its home position where resilient connectors 394*a* and 394*b* are in their rest (i.e. undeformed) state as shown in FIG. 14A, continued rotation of the traveler 382 in the second direction retracts the first brake member 332 away from the check arm 318 and brings the brake member 332 to its retracted position. At that point both brake members 332 and 334 are retracted from the check arm 318, permitting the check arm 318 to move freely through the check arm holder 320, and thus permitting free movement of the door 16 to a new position. It will be noted that, while in this example, the brake members 332 and 334 are spaced away from the check arm 318 when in the retracted state. In other embodiments, however, the brake members 332 and 334 may not retract fully away from the check arm 318 when in the retracted position—they may instead still have some contact with the check arm 318 so as to apply some selected small drag force thereon. In such embodiments, it is still advantageous to have the resilient connectors 394*a* and 394*b* which permit transverse movement of the check arm holder 320 so that the forces exerted by each of the brake members 332 and 334 on the check arm 318 can be somewhat equalized.

The check arm holder 320 has been described above as being movable transversely in embodiments wherein a single brake member 332 is being driven. Additionally or alternatively, the check arm 318 itself may be transversely movable so as to permit some equalization of the forces on it from the brake members 332 and 334. Such transverse mobility of the check arm 318 may be provided in a number of ways. For example, the check arm 318 may be sufficiently flexible along the transverse axis that, over at least some of the range of movement of the door 16, the check arm 318 bends as needed to permit some transverse movement of the segment of the check arm 318 that is between the brake members 332 and 334. It will be noted, however, that the amount of transverse movement that is available to the segment of the check arm 318 that is between the brake members 332 and 334 depends at least in part on the moment arm of the brake force acting on the check arm 318 by the brake members 332 and 334 relative to the mounted end of the check arm 318. This moment arm will vary depending on the position of the door 16. In some other embodiments, the check arm 318 may be held on a sleeve that is transversely slidable on a pin on a check arm mounting bracket that is mounted to the vehicle body 14. For greater certainty, it will be understood that in some embodiments the check arm 318 may be transversely movable in addition to the check arm holder 320 being transversely movable, whereas in other embodiments the check arm 318 may be transversely movable and the check arm holder 320 may be transversely fixed. In other embodiments, the check arm 318 may be transversely fixed and only the check arm holder 320 may be transversely movable. In still other embodiments, both the check arm 318 and the check arm holder 320 may be transversely fixed with only a single driven brake member. In still other embodiments both brake members 332 and 334 may be driven mechanically, by a lead screw with two oppositely threaded regions each of which has a traveler thereon which is connected to a brake member.

A controller shown at 322 in FIG. 12, and sensors (not shown) used in the door control system 300 may be similar to those used in the door control system 10. The controller 322 may be provided in the housing alongside the motor 335 in similar manner to the positioning of controller 22 (FIG. 5) to motor 35). A sensor similar to sensor 64 (FIG. 4B) or sensor 90 (FIG. 4C) may be provided for determining the position of the check arm 318 and accordingly, the position of the door 16. The check arm 318 may be modified as needed from what is illustrated in FIGS. 12-14 for that purpose. A sensor (e.g. a Hall-effect sensor) may be provided for determining the motor position by measuring the number of rotations of an end of the output shaft (shown at 376) of the motor 335. The other sensors and controls provided for the door control system 10 (FIGS. 3-7) may also be used for the door control system 300, except for any sensors used to determine fluid pressure since these would not be applicable. The controller 322 may be configured to apply a selected brake force based on the motor position (using the Hall-effect sensor that is not shown) or traveler position.

One difference in the programming of the controller for the door control system 300 is that the home position for the master cylinder 39 in FIG. 6 is related to actuation of the limit switch 82. This home position results in a known position for the brake members 332 and 334. For the embodiment shown in FIGS. 12-14*b*, however, the home position for the traveler 382 is arrived at in relation to the advanced position for the brake members 332 and 334. More specifically, movement of the brake members 332 and 334 to the home position may be as follows: The motor 335 is rotated in the first direction to bring the brake members 332 and 334 to their maximum advanced positions until the controller (not shown) detects that the motor 335 has stalled. This may be referred to as the motor stall position. At that point, the motor 335 is rotated in the second direction to retract the brake members 332 and 334. The rotation in the second direction may be over a selected number of turns as detected by a Hall-effect sensor or some other suitable sensor. Once the controller has detected that the motor 335 rotated through the selected number of turns, power is cut to the motor 335 at which point the brake members 335 are in their home (retracted) position. The controller can then count turns of the motor 335 to bring the brake members 332 and 334 to selected positions so as to apply a selected brake force on the check arm 318. Experiments can be carried out during development of the door control system 300 to correlate brake member position with brake force and this correlation can be stored in the controller's memory. The advantage of using the motor stall position as the reference position from which the controller brings the brake members to their home position is that the home position ends up being a consistent distance from the motor stall position regardless of the degree of pad wear. As a result, the correlation between the number of turns of movement away forward from the home position remains consistent over time regardless of pad wear. As noted above, such an issue does not exist in embodiments of the door control system 10 shown in FIGS. 3-7 wherein the master cylinder 39 is moved until the controller 22 detects a selected pressure since the pressure is directly related to the brake force applied by the brake members 32 and 34 independent of the amount of pad wear or the particular position of the brake members 32 and 34.

Figure 15:
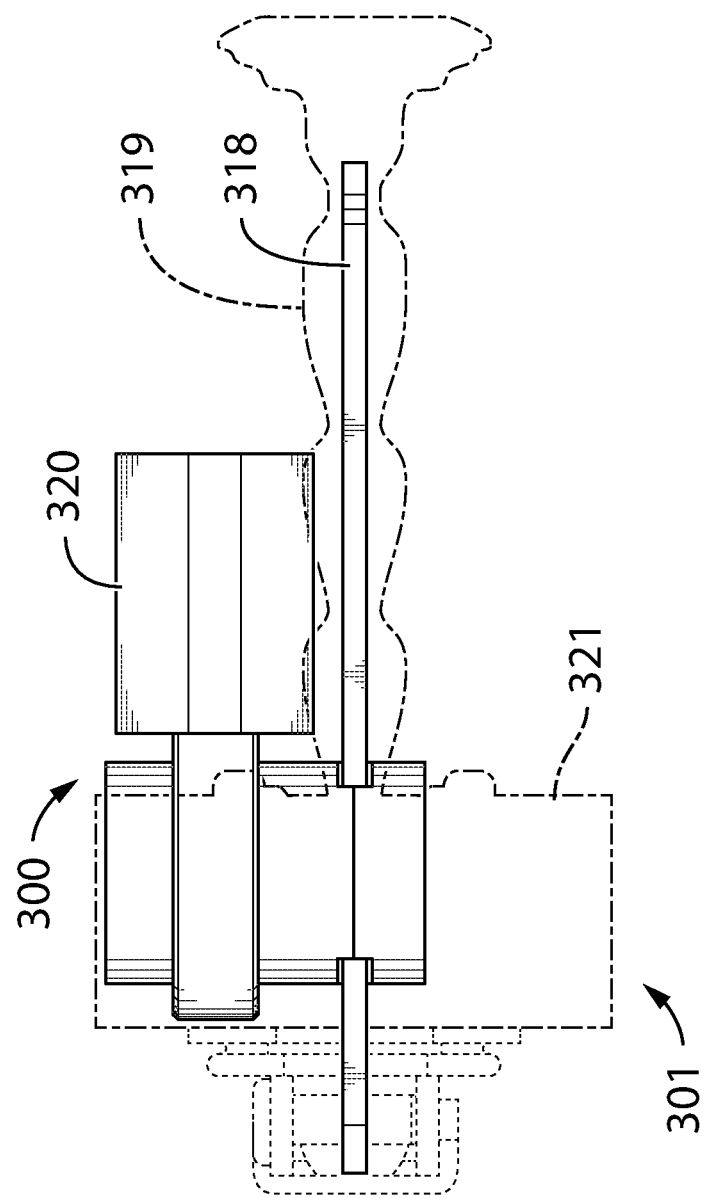
FIG. 15 is a side view comparing the door control system shown in FIG. 12 with a standard door check, illustrating the compactness of the door control system.

The embodiment shown in FIGS. 12-14 is simpler than the embodiment shown in FIGS. 3-7 in the sense that a number of elements (master piston, hydraulic fluid passage system, seals on brake pistons) have been eliminated. By providing a mechanical drive for the door control system 300 and eliminating the hydraulic drive components that were associated with the door control system 10, the door control system 300 may be even more compact than the door control system 10, and even simpler and correspondingly less expensive to manufacture. One aspect of its simplicity is the number of mechanical components involved in its construction, which may be 11 in some embodiments. As can be seen in FIG. 15, the overall occupied volume of the door control system 300, including the check arm 318 and the check arm holder 320, may be substantially the same as the overall occupied volume of a typical passive door control system shown at 301, which includes a check arm 319 and a check arm holder 321, that is in use in some vehicles today. Thus, the door control system 300 could be installed in a vehicle in place of a standard door check 301 without requiring any rearrangement of any of the other components that are present in the vehicle door 16 (e.g. window regulator, speaker, etc).

Figure 16:
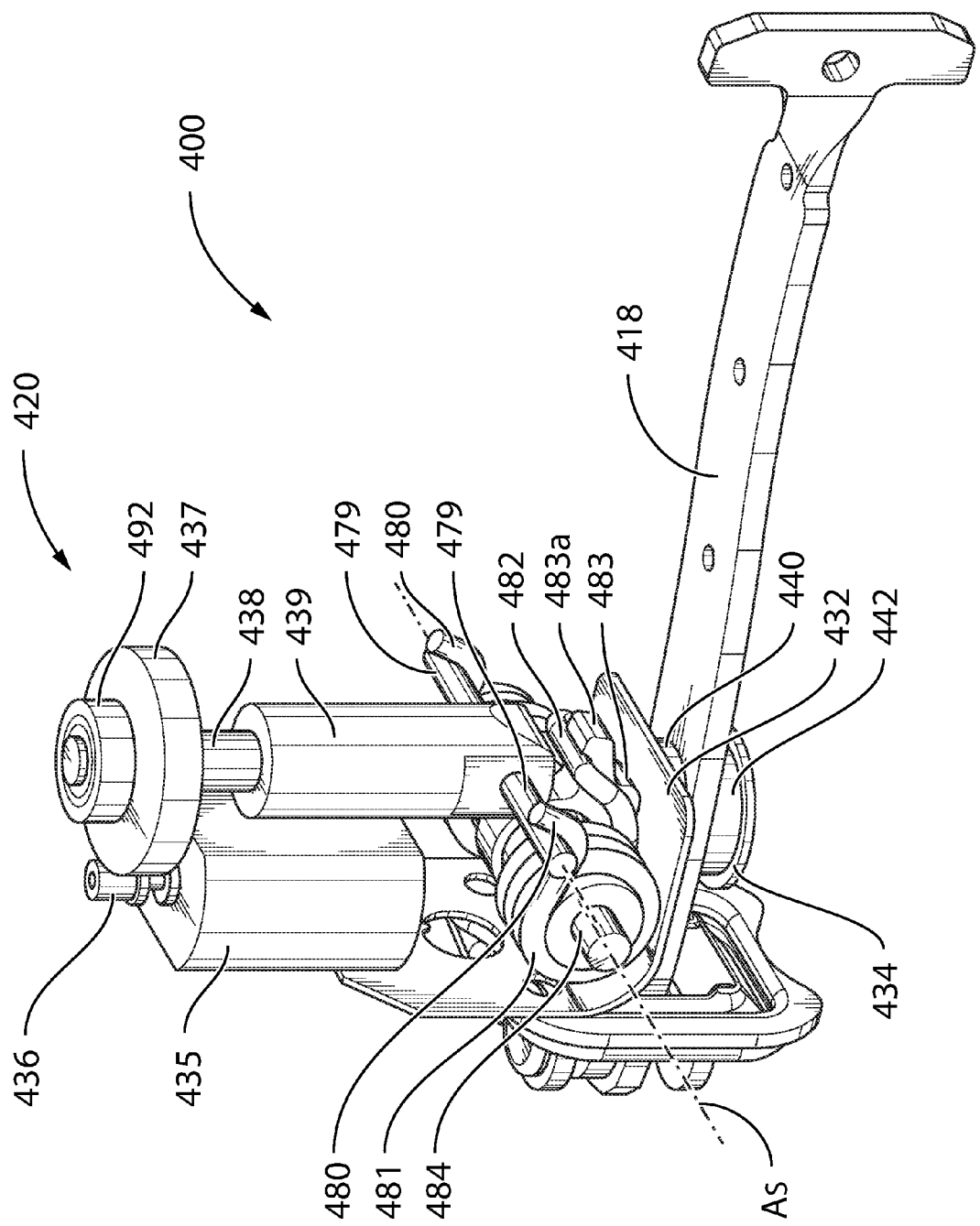
FIG. 16 is a perspective view of another alternative door control system including a check arm and a check arm holder.
Figure 17:
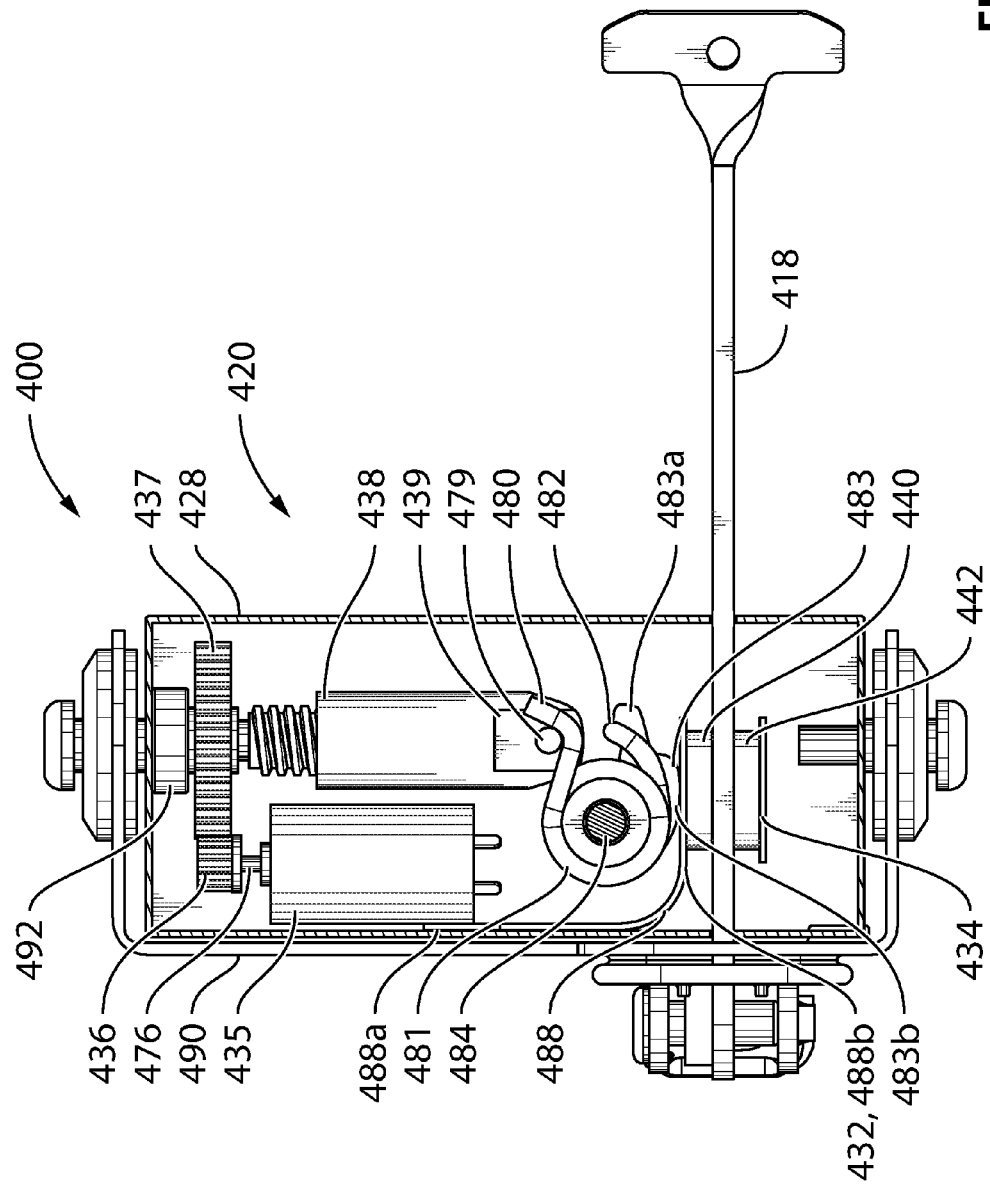
FIG. 17 is a side view of the alternative door control system shown in FIG. 16.

Reference is made to FIGS. 16-17, which show another embodiment of a door control system 400. The door control system 400 may be similar to the door control system 300 except that the door control system 400 is configured to permit a greater range of rotational movement of the motor (shown at 435) relative to the movement of the brake pistons (shown at 432 and 434), thereby permitting finer control over the brake force being applied by the brake pistons 432 and 434.

The door control system 400 includes a check arm 418 that may be similar to the check arm 18 and a check arm holder 420 that includes a housing 428 (shown in FIG. 17 in section as a box for simplicity but which may have a different shape), the aforementioned motor 435, a motor-driven spur gear 436 that is mounted to the motor output shaft shown at 476, a driven spur gear 437 which is integrally connected to a lead screw 438, which engages an internally threaded plunger 439. The plunger 439 includes a pair of engagement bars 479, which engage first ends 480 of a torsion spring 481. The torsion spring 481 has a second end 482 that engages a drive arm 483a of a cam 483. The torsion spring 481 itself may wrap around a pair of stub shafts 484 that extend laterally outward from the cam 483. The stub shafts 484 engage apertures 485 in the housing, thereby permitting pivoting of the cam 483 relative thereto. The cam 483 has a cam surface 483b that is engageable with a first brake member 432. The first brake member 432 is movably connected to the housing 428 via a leaf spring 488. The leaf spring 488 may have a first end 488a connected to the housing 428 and a second end 488b that is integral with and that may essentially the first brake member 432. A first brake pad 440 is connected to the brake member 487 and is positioned to engage a first side of the check arm 418. A second brake member 434 may be stationary within the housing 420 and may comprise a shoulder in the housing 420 with a second brake pad 442 mounted thereto for engagement with a second side of the check arm 418.

Rotation of the motor 435 in a first direction causes rotation of the lead screw 438 which in turn drives the plunger 439 to advance (i.e. to move downwardly in the views shown in FIGS. 16 and 17), thereby moving the first ends 480 of the torsion spring 481 downwards, which in turn increases the spring force exerted by the second end 482 on the cam 483, and thus by the cam 483 on the first brake member 432, thereby moving the first brake member 487 towards its advanced position. Rotation of the motor 435 in a second direction causes rotation of the lead screw 438 which in turn drives the plunger 439 to retract (i.e. to move upwardly in the views shown in FIGS. 16 and 17), thereby moving the first ends 480 of the torsion spring 481 upwards (due to the retraction of the plunger 439 and the engagement bars 479 which permits movement of the first ends 480 of the spring 481 upwards). This in turn decreases the spring force exerted by the second end 482 on the cam 483, and thus by the cam 483 on the first brake member 432. If this force is reduced sufficiently, the leaf spring 488 drives the first brake member 432 to a retracted position at which the first brake member may be away from the surface of the check arm 418 or is at least at a position at which the braking force exerted thereby on the check arm 418 is reduced.

It will be noted that, because the check arm holder 420 only shows a single brake member being directly actuated by the cam 483, the check arm holder 420 shown in FIGS. 16 and 17 may, in similar fashion to the embodiment shown in FIGS. 12-14, be movable transversely relative to the axis of the check arm 418 so as to permit the brake members 432 and 434 to be centered on the check arm 418. For example, the check arm holder 420 may be mounted to a mounting bracket 490 that is fixedly mounted to the door 16. The mounting bracket 490 may be similar to the mounting bracket 390 and the connection between the check arm holder 420 and the mounting bracket 490 may be similar to the connection between check arm holder 320 and mounting bracket 390, to similar effect.

An angular contact bearing 492 is provided for supporting the rotation of the driven gear 437. The bearing 492 may be configured to handle the thrust force exerted on the lead screw 438 (and thus the driven gear 437) from the plunger 439.

As noted above, the door control system 400 is provided in order to give a greater range of movement to the brake member 432 (and the consequent finer control over the braking force available as a result), as compared to some embodiments of the door control system 300 shown in FIGS. 12-14. In some embodiments, the door control system 300 may complete the range of movement of the brake piston 332 in as few as three turns of the motor output shaft 376, which results in as little as less than 1 mm of linear movement of the traveler 382. By contrast, the spring 481 in the door control system 400 can be provided with any selected spring rate, in order to provide a selected amount of linear travel of the brake member 432 so as to provide a selected fineness of control over the braking force applied by the brake members 432 and 434. In other words, by providing the spring 481, the overall linear range of movement of the plunger 439 may be selected to be greater (optionally much greater) than the linear range of movement of the traveler 382. As a result, each rotation of the motor 435 results in a smaller change in the amount of force that is applied by the brake members 432 and 434 as compared to the change in force resulting from each rotation of the motor 335. Consequently, providing the spring 481 (and more particularly, providing the spring 481 with a selected spring rate) permits relatively finer control over the braking force applied by the brake members 432 and 434 than is available for the door control system 300.

Furthermore, the addition of the spring 481 may permit in some embodiments, the motor 435 to be smaller than the motor used in some other embodiments, particularly in embodiments wherein the lever arm between the points at which the bars 479 exert a force on the first end 480 of the spring 481 and the pivot axis $A_S$ of the spring 481 (i.e. the axis of the stub shafts 484) is larger than the lever arm between the pivot axis of the spring 481 and the points at which the second end 482 of the spring 481 exert a force on the brake member 432. This is because an additional mechanical advantage is provided by the difference in the lever arms. However, the sizing of the motor 435 also depends in part on the gearing used at the output of the motor 435 and the reaction times that are needed in order for the door control system 400 to perform acceptably.

A controller (not shown) is provided for the door control system 400 and may be similarly programmed to the controller 22, but which controls the braking force of the brake members 432 and 434 by counting the number of rotations of the motor output shaft 476 away from a reference position at which the brake member position is known and at which a known brake force is applied to the check arm 418. The reference position may be, for example, a position at which the motor 435 has advanced the brake member 432 as far as possible into the check arm 418 until the controller detects that the motor 435 has stalled. At this point, the position of the brake member 432 is known (it is advanced as far as possible into the check arm 418) and the brake force is known (it is the maximum brake force value that the motor 435 is capable of generating, which may be determined empirically beforehand—during development of the door control system 400, so that the value can be programmed into the controller). Empirical testing of the check arm holder 420 can be used to determine the actual brake force that is applied to the check arm 418 over a range of positions of the motor output shaft 476 (i.e. the actual brake force applied to the check arm 418 when the output shaft 476 is backed off by one rotation from the reference position, by two rotations from the reference position, by three rotations from the reference position, and so on). This data may be programmed into the controller so that the controller can control the braking force being applied directly based on the position of the motor output shaft 476, instead of controlling the braking force based on sensing the fluid pressure as is described above in relation to the door control system 10.

The controller for the door control system 300 (FIGS. 12-14) may also be operated in the same way (i.e. to control the braking force based solely on the position of the motor output shaft 376 relative to a reference position that corresponds to a motor stall condition), and for any other embodiments in which a fluid is not used to drive a brake member into engagement with the check arm.

It will further be noted that the controller 22 (FIGS. 3-7) may itself also be operated to control the braking force applied by the brake members 32 and 34 based solely on the motor output shaft position relative to a reference position corresponding to a motor stall condition, instead of controlling the braking force based on operating the motor 35 to reach a selected fluid pressure.

Figure 18:
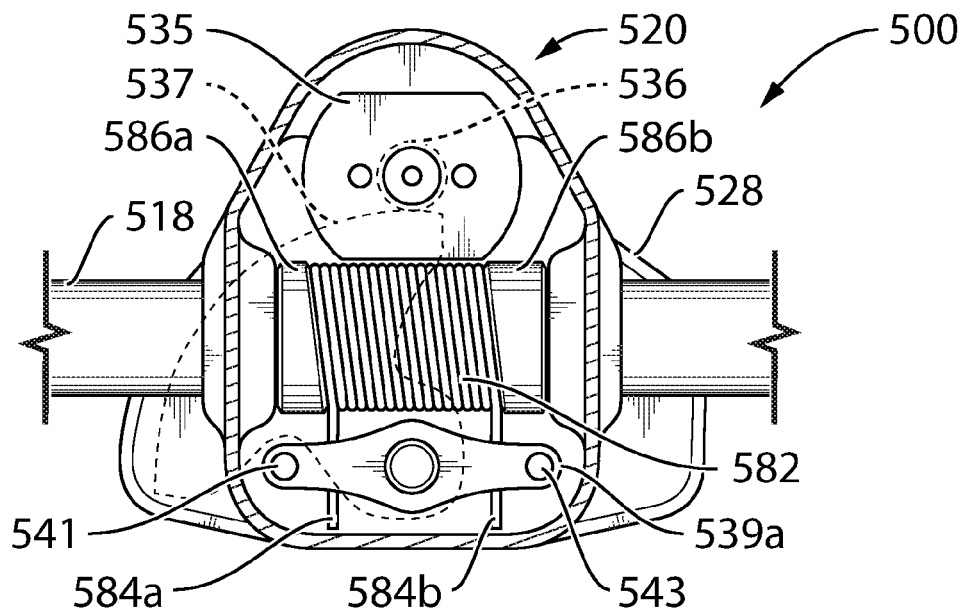
FIG. 18 is a plan view of yet another alternative door control system including a check arm and a check arm holder.
Figure 19:
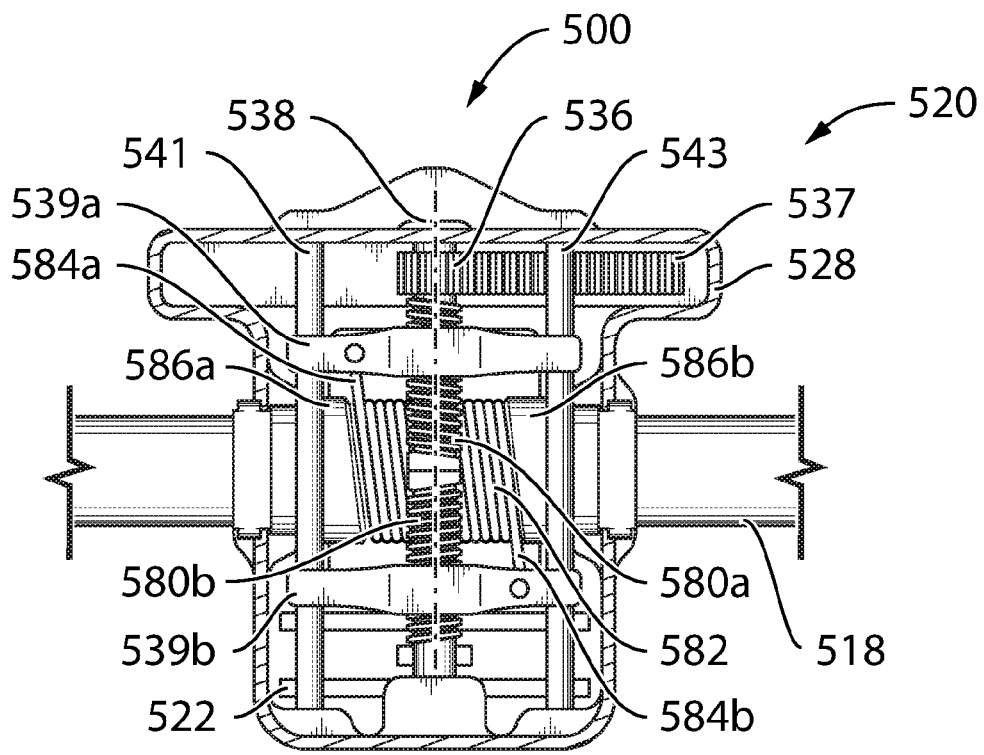
FIG. 19 is a side view of the door control system shown in FIG. 18.
Figure 20:
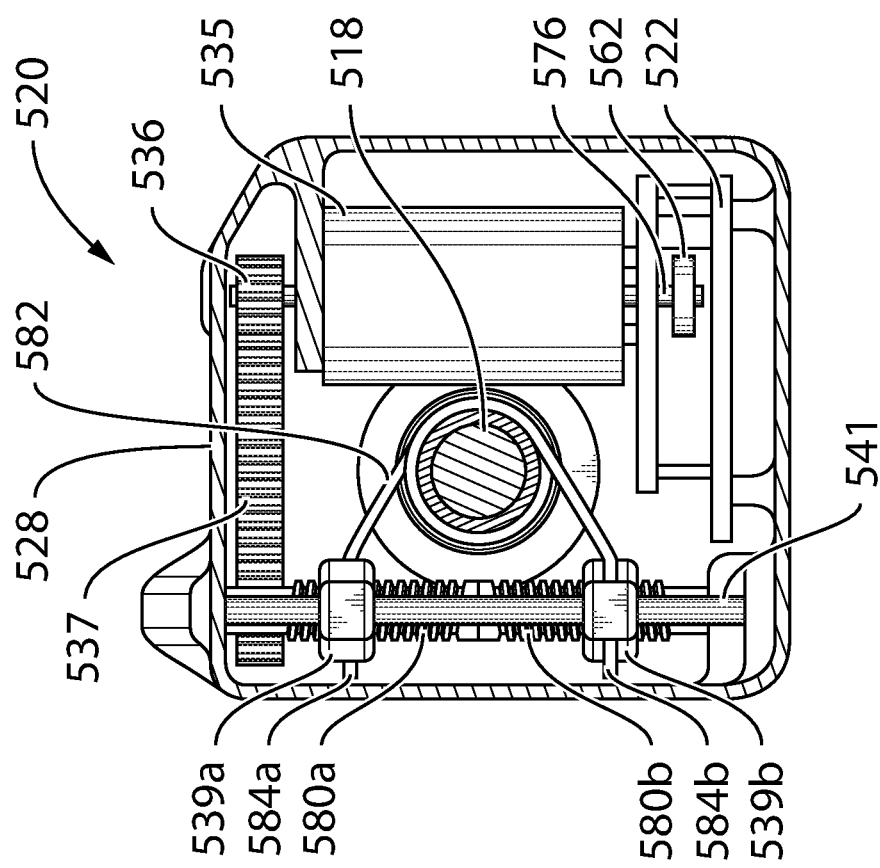
FIG. 20 is a front view of the door control system shown in FIG. 18.

Reference is made to FIGS. 18-20, which show another embodiment of a door control system shown at 500. The door control system 500 includes a check arm 518 and a check arm holder 520. The check arm 518 may in this case have a generally cylindrical shape, and may be straight, or it may extend arcuately. The check arm 518 may be solid, or hollow, but is preferably hollow to reduce weight. The check arm 518 may be pivotally mounted to the body of the vehicle (not shown in FIGS. 18-20) by a similar mounting means provided for the other check arms described herein.

The check arm holder 520 includes a housing 528 through which the check arm 518 passes and which contains seals for engaging the check arm 518 to inhibit ingress of debris and moisture into the housing 528. The check arm holder 520 further includes a motor 535 having an output shaft 576, a pinion gear 536 (in this example, a spur gear shown in dashed outline in FIG. 18) on the output shaft 576, a driven gear 537, which in this example is a sector gear (shown in dashed outline in FIG. 18), a double-threaded lead screw 538 with a first threaded portion 580a and a second threaded portion 580b, a first traveler 539a on the first threaded portion 580a, a second traveler 539b on the second threaded portion 580b, a wrap spring clutch 582, a controller 522 and a plurality of sensors (one of which is shown at 562 for taking measurements of the motor speed). The wrap spring clutch 582 has a first end 584a that is connected to the first traveler 539a and a second end 584b that is connected to the second traveler 539b.

Rotation of the motor 535 in a first direction causes rotation of the sector gear 537 and the lead screw 538 in a first lead screw direction, which drives the travelers 539a and 539b towards each other. The travelers 539a and 539b slidable along guide bars 541 and 543 and are constrained thereby for linear movement in the housing 528. The movement of the travelers 539a and 539b towards each other causes the wrap spring clutch 582 to contract radially, which in turn causes it to clamp down onto the check arm 518 thereby exerting a braking force on the check arm 518. The more the travelers 539a and 539b move towards each other, the greater the clamping (braking) force. As can be seen in FIGS. 18 and 19, the wrap spring clutch 582 rests axially between first and second limit members 586a and 586b, which hold the wrap spring clutch 582 substantially stationary in the axial direction. As a result, when the wrap spring clutch 582 clamps down on the check arm 518, the check arm 518 is held stationary.

Rotation of the motor 535 in a second direction causes rotation of the sector gear 537 and the lead screw 538 in a second lead screw direction, which drives the travelers 539a and 539b away from each other. This movement of the travelers 539a and 539b causes the wrap spring clutch 582 to expand radially, which in turn causes it to reduce its grip on the check arm 518. The more the travelers 539a and 539b move away from each other, the more the wrap spring clutch reduces its grip (i.e. reduces the braking force) on the check arm 518.

The controller 522 controls the operation of the motor 535 and may follow similar logic to that used by the controller described above in relation to the door control system 400.

Reference is made to FIG. 21, which shows another embodiment of a door control system 600. The door control system 600 shown in FIG. 21 is operated by application of fluid pressure and may thus be similar to the door control system 10 shown in FIGS. 3-7, however the door control system 600 includes a check arm 618, and a check arm holder 620 that includes two separate subassemblies (shown at 620a and 620b) which are separate from each other. The first subassembly 620a, shown more clearly in FIG. 22, may include a first subassembly housing 628a, brake members 632 and 634 which have brake pads 640 and 642 thereon, and which may be similar to brake members 32 and 34, and a door position sensor 64. The second subassembly 620b, shown more clearly in FIGS. 23A and 23B, may include a master piston 639 (shown in both retracted and advanced positions), a motor 635, first and second gears 636 and 637 which may be a spur gears or any other suitable types of gear, a lead screw 638, and a controller 622. All of these components may be similar to their counterpart components (which have similar reference numbers) in the embodiment shown in FIGS. 3-7. A fluid conduit shown at 691 may be used to fluidically connect the first subassemblies 620a and 620b. An electrical conduit extends along the fluid conduit 691 and may be used to electrically connect the sensor 664 with the controller 622 so as to permit the carrying of sensor signals back to the controller 662.

By dividing the system 600 into multiple subassemblies, it is possible to position only selected components in the door 16 near the check arm 618, while positioning the other components remotely so as to minimize intrusion into the region of the door 16 in which the window regulator (not shown) would be placed. The second subassembly 620b may be placed in the door 16 up near the position of the mirror (not shown), as shown in FIG. 21. An additional advantage to such positioning is that it permits the use of an obstacle sensor 668 (e.g. an ultrasonic sensor) that is integrated within the housing of the second subassembly 620b, that does not interfere with certain other systems within the door (e.g. the window regulator and the door latch) and/or that can be obscured from view from the vehicle owner so as not to detract from the aesthetic appearance of the vehicle, by being incorporated underneath the vehicle's side mirror (not shown). In such an embodiment, the sensor 668 may be aimed generally downwards at a sufficient angle to cover a selected lateral space around the trailing edge of the door 16.

Figure 24:
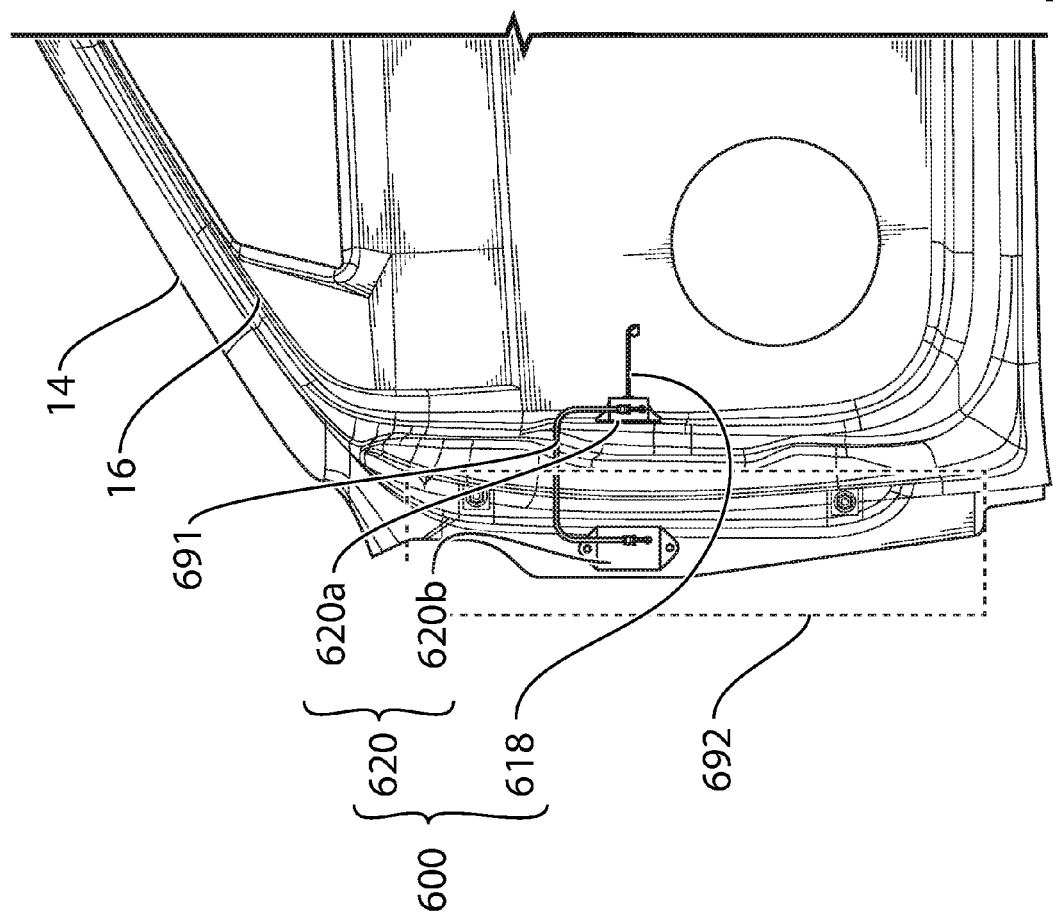
FIG. 24 is an alternative arrangement of the first and second subassemblies to that which is shown in FIG. 21.

Alternatively, as shown in FIG. 24, the second subassembly 620b may be placed anywhere else that is suitable and may even be positioned inside the body 14 of the vehicle 12, in particular in a 'dry' zone of the vehicle 12, shown schematically at 692, that is considered to be safe from exposure to moisture. This can reduce the cost for the motor and other electrical components since they do not need to be protected from moisture in the manner that they would if they were mounted in an area of the vehicle where moisture can reach them, such as in the door 16. In such an embodiment, the fluid conduit 691 passes between the body 14 and the door 16. A suitable seal may be provided for where the conduit 691 passes into the body 14 so as to prevent moisture from entering the dry zone 692. A seal is also provided where the fluid conduit 691 enters the door 16 so as to inhibit entry of moisture into the door 16. The conduit 691 may be flexible so as to ensure that it does not inhibit movement of the door 16.

The arrangement shown in FIG. 24 is advantageous in that no additional power needs to be sent to the door 16 from the vehicle's electrical system in order to power the check arm holder 620 since the motor 635 and the controller 622 are positioned in the vehicle body 14.

The fluid passage system shown at 644 for the check arm holder 620 may be similar to the fluid passage system 44 shown in FIG. 5, and is divided into first and second portions 644a and 644b in similar manner to fluid passage system 44, however, the first portion 644a includes the fluid conduit 691 which connects between a first port 693a on the first subassembly 620a and a second port 693b on the second subassembly 620b.

While the check arm holder 620 is shown to include two sub assemblies 620a and 620b, it will be understood that it could include more than two subassemblies.

In some of the embodiments described herein, the use of brake pistons is described. It will be understood that these are merely examples of brake members that are movable relative to the housing in which they are situated. It will further be understood that, while in some embodiments a single brake member is moved relative to the housing and in other embodiments two brake members are movable relative to the housing, any of these embodiments may be configured to be operated with one or more brake members that are movable relative to the housing.

While a detailed description of the components used to cause movement of one or more of the first and second brake members have been described in each of the embodiments described herein, the components may collectively be referred to as a brake member actuator.

In embodiments wherein a motor is described and a plurality of components are driven by the motor so as to transfer power ultimately to one or both of the brake members those components may collectively be referred to as a drive train.

Figure 25:
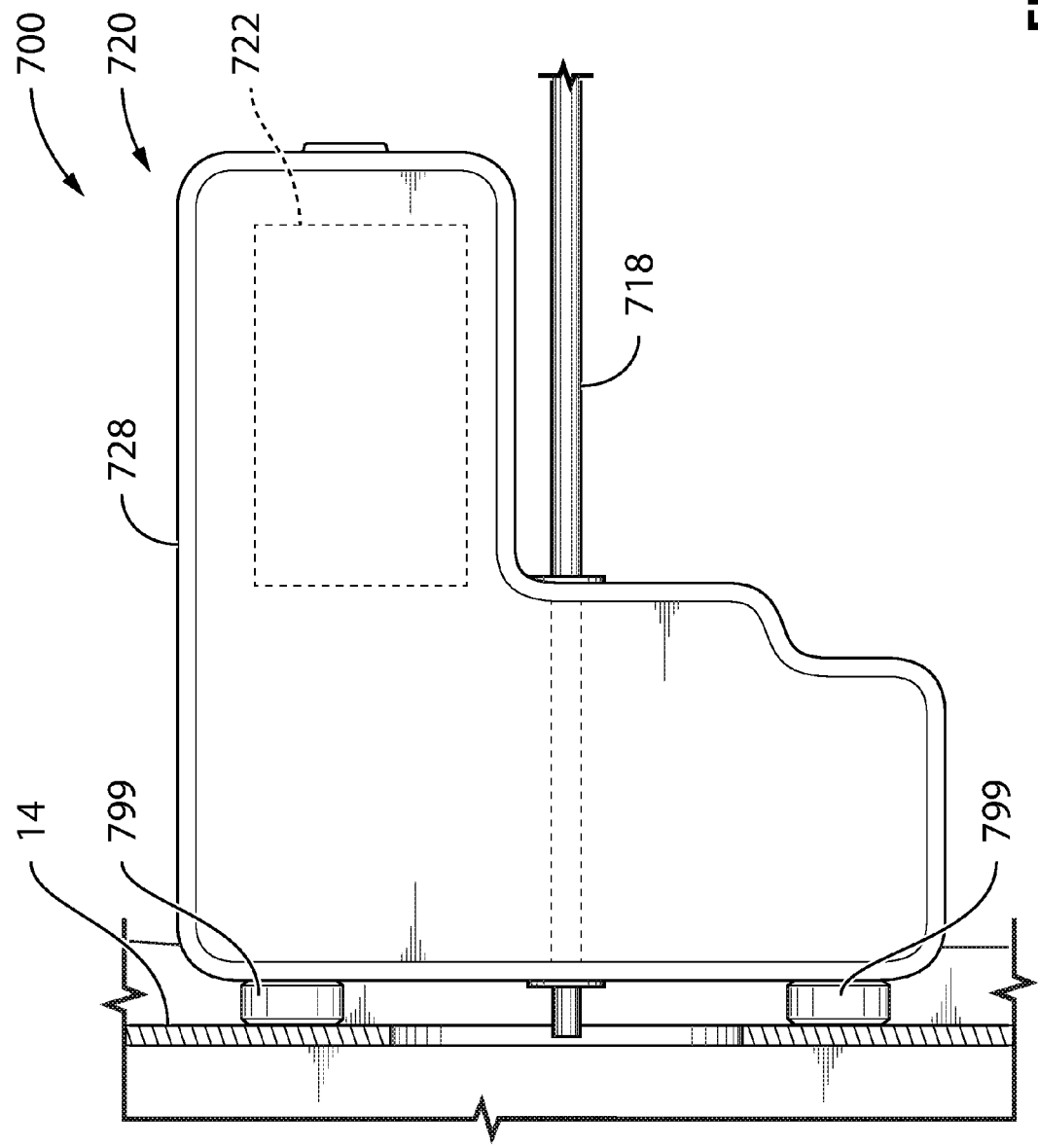
FIG. 25 is a side view of an alternative embodiment, showing the use of load cells to sense force applied to the vehicle door.
Figure 26:
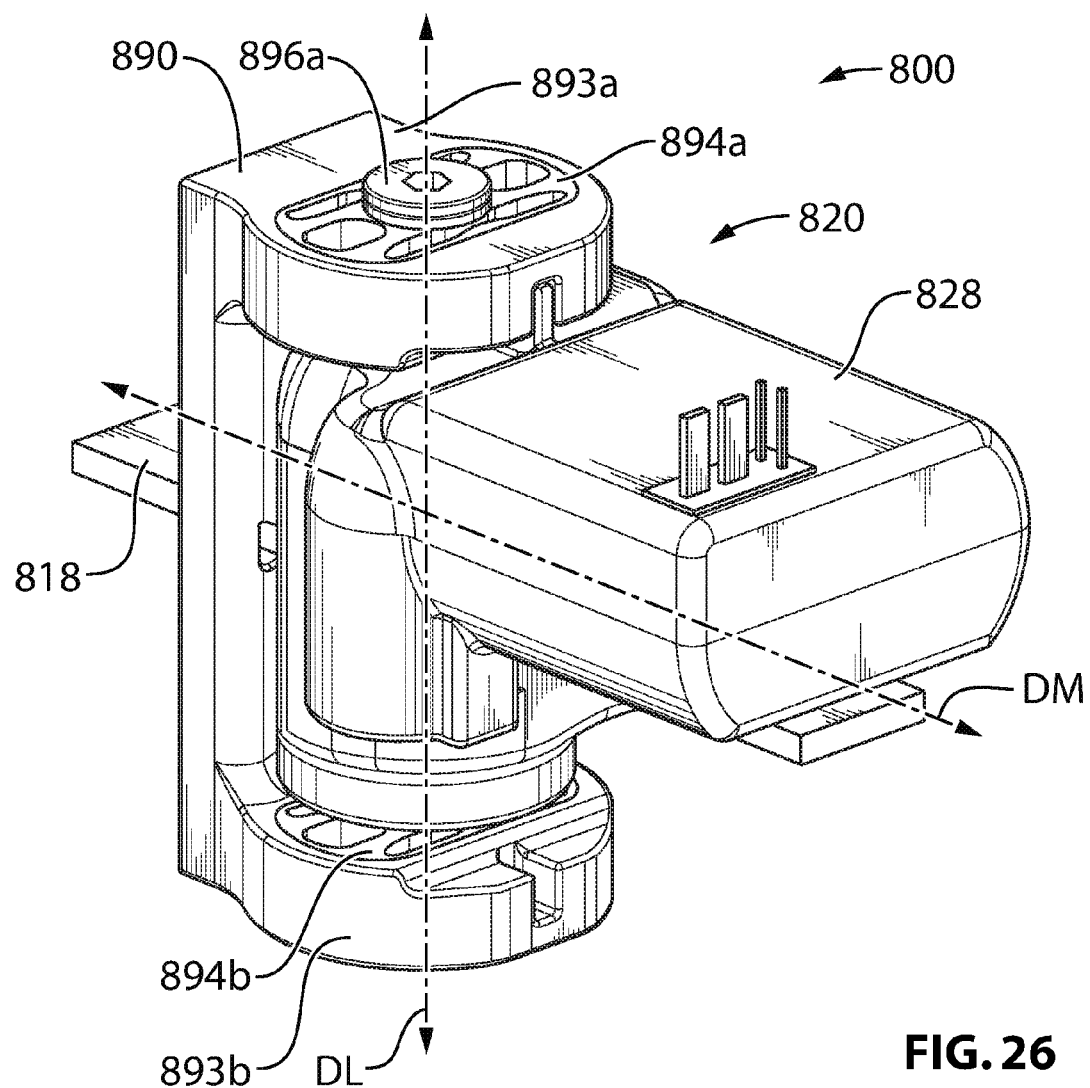
FIG. 26 is a perspective view of another alternative embodiment, showing the use of another structure adapted to sense force applied to the vehicle door.

Reference is made to FIG. 25, which shows an embodiment of a door control system 700, which may be similar to any of the door control systems described above and which includes a check arm 718 that may be similar to the check arm 18, a check arm holder 720 that is similar to the check arm holder 20 and is configured to apply a variable brake force on the check arm 718, and a controller 722. The controller 722 may be similar to the controller 22, but may be programmed to release a checked door (i.e. to enter the 'TO BRAKE RELEASED' state) based on sensing whether or not the force being applied to the door 16 by the user (i.e. the initiation force) exceeds a threshold force instead of sensing whether the door 16 has been moved from a checked position by a selected threshold amount. The threshold force may be adjusted taking into account selected parameters, such as user input via an interface in the vehicle, data related to the angle of the vehicle (i.e. data relating to whether the vehicle is on an incline) or any other suitable parameters.

The controller 722 receives signals from a force sensing device that is positioned to sense an initiation force being exerted on the vehicle door by a user. For example, the check arm holder housing shown at 728 may be mounted to a plurality of load cells shown at 799 which are themselves mounted to the door 16 and which are connected via wires or wirelessly to the controller 722. In the embodiment shown, one load cell 799 is provided at each corner of the check arm holder housing 728. While a plurality of load cells 799 are shown, it is optionally possible to provide as few as one load cell 799, and simple polymeric mounting elements in place of the others. The controller 722 is programmed to reduce the braking force applied by the check arm holder 720 based on whether the initiation force exceeds a threshold force. In other respects, the programming of the controller 722 may be similar to the programming of the controller 22.

In embodiments such as the embodiment shown in FIG. 14A, wherein the housing 328 is itself movable transversely (e.g. where one brake member such as brake member 334 is fixedly mounted to the housing 328), the one or more load cells 799 could be positioned between the mounting bracket 390 and the door 16.

Figure 27:
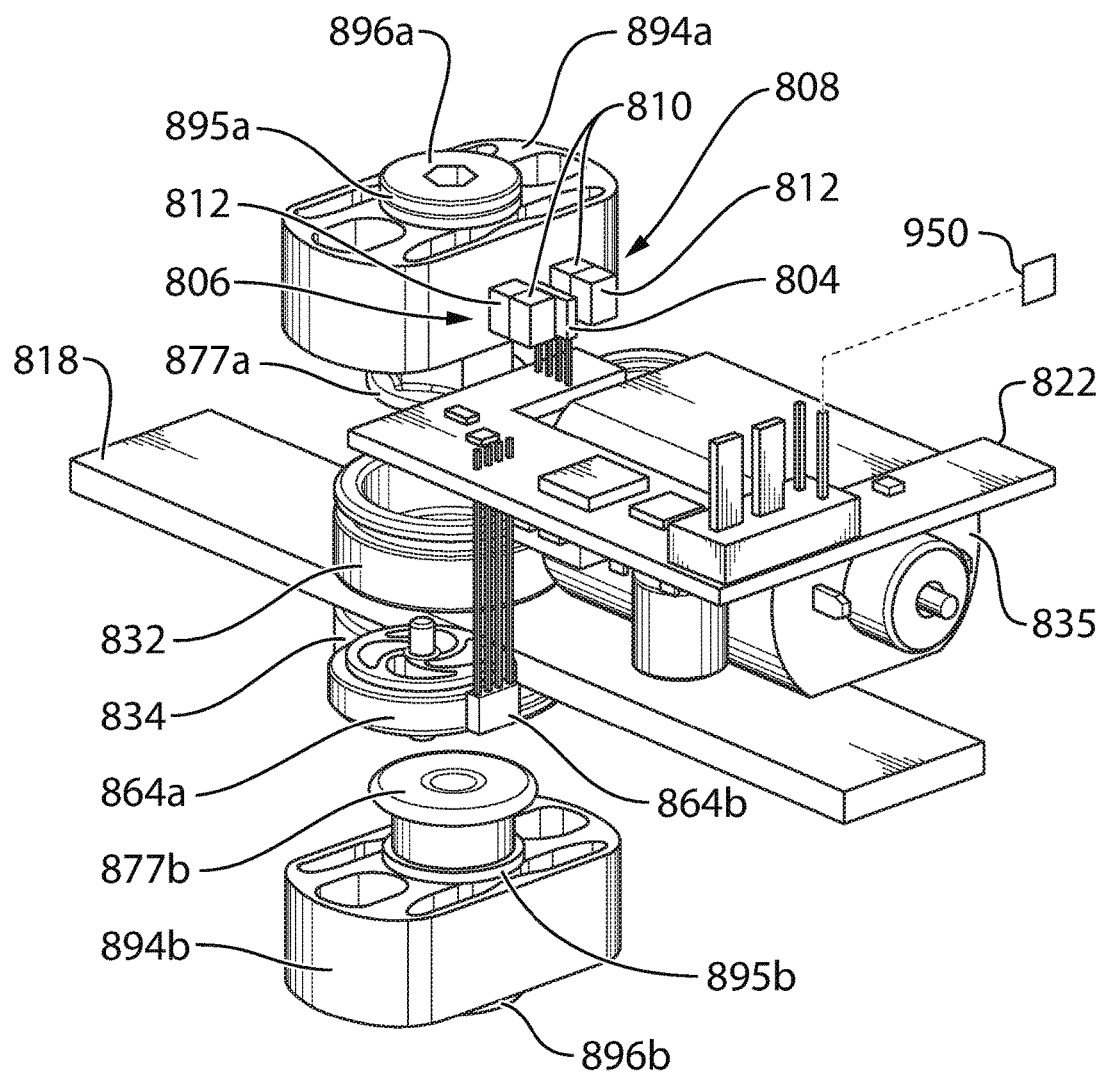
FIG. 27 is a perspective view of the embodiment shown in FIG. 26, with selected components removed to better show the structure for sensing force.

Reference is made to FIGS. 26-29, which show a door control system 800 that, like the embodiment shown in FIG. 25, is capable of sensing the amount of force being applied to the door 16 (FIG. 1), but which uses different structure to that shown in FIG. 25. The door control system 800 includes a check arm 818 that may be similar to the check arm 18 (FIG. 3), a check arm holder 820 and a controller 822 (FIG. 27).

The check arm holder 820 may be similar to the check arm holder 20 (FIG. 3), and may drive brake members which are pistons 832 and 834, and which are similar to pistons 32 and 34, using a hydraulic system similar to the hydraulic system shown in FIGS. 5-7. As with other embodiments described herein, the check arm 818 may be mounted (e.g.

pivotally mounted) to one of the door 16 or the body 14 of the vehicle 12, and the check arm holder 820 may be mounted to the other of the door 16 or the body 14.

One difference between the check arm holder 820 and the check arm holder 20 is that the check arm holder 820 contains a force sensing device 804, which may be a linear Hall effect sensor 804 (FIG. 27) that is positioned to sense at least one magnet that is positioned adjacent to the linear Hall effect sensor but is mounted to the mounting bracket 890. In the embodiment shown, there are first and second magnets 806 and 808 which are positioned on either side of the Hall effect sensor 804. The magnets 806 and 808 each have a first pole 810 and an opposite, second pole 812 which are aligned with the general direction of movement of the check arm holder 820 and the check arm 818 relative to each other when a force (i.e. an opening or closing force) is applied to the door 16 (FIG. 1). This direction of movement is shown at DM in FIG. 26. As can be seen in FIG. 27, the magnets are positioned such that the poles on the first magnet 806 point in opposite directions to the poles on the second magnet 808. In other words the first pole 810 of the first magnet 806 and the second pole 812 of the second magnet 808 both point in the same direction, and the second pole 812 of the first magnet 806 and the first pole 810 of the second magnet 808 both point in the same direction.

A mounting bracket 890 may be similar to the mounting bracket 390, and is fixedly mounted to the vehicle door 16 (FIG. 1). The check arm holder 820 is mounted to the mounting bracket 890, optionally in similar manner to the mounting of the check arm holder 320 to the mounting bracket 390 (FIG. 14*a*). In an embodiment, the check arm holder 820 may be pivotally mounted to the mounting bracket 890 by means of at least one resilient connector (which is two resilient connectors 894*a* and 894*b* in the embodiment shown in FIGS. 26-29). The check arm holder housing, shown at 828, is similar to the check arm housing 328 and includes first and second internal nuts 877*a* and 877*b*, each having an internally threaded aperture 891*a* and 891*b* respectively (FIG. 29). These apertures are situated at first and second transverse end walls of the housing 828. The mounting bracket 890 includes first and second ears 893*a* and 893*b*. The resilient connectors 894*a* and 894*b* are held in apertures in the ears 893*a* and 893*b* respectively. The resilient connectors 894*a* and 894*b* may be made from any suitable material such as a natural or synthetic elastomeric material, such as for example a suitable rubber. Bushings may be provided in apertures 900 (FIG. 29) in the connectors 894*a* and 894*b* to provide sufficiently low-friction sliding contact with the shoulder bolts shown at 896*a* and 896*b* that pass through the connectors 894*a* and 894*b*. The bushings may be separate elements that mount in the apertures 900, or they may be coatings applied to the aperture wall or, for example they may be elements that are co-molded with the connectors 894*a* and 894*b*. This arrangement permits rotational movement of the check arm holder 820 relative to the mounting bracket 890, which permits the check arm holder 820 to pivot as needed to accommodate the check arm 818 as it moves to and fro through the check arm holder 820 during swinging of the door 16 (FIG. 1) in one direction or another. The bushings are shown at 895*a* and 895*b* in FIG. 27.

Figure 28:
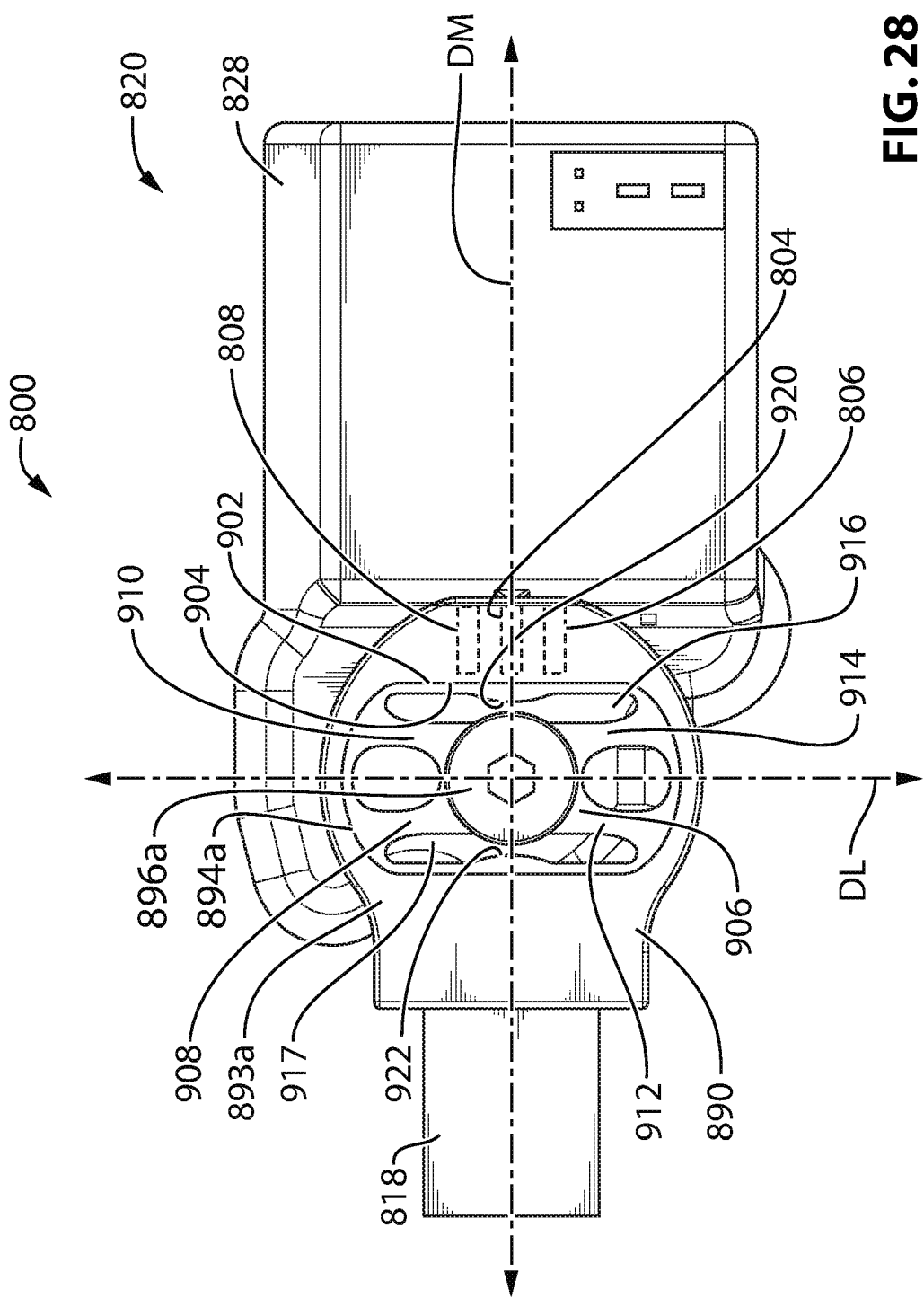
FIG. 28 is a top plan view of the embodiment shown in FIG. 26.
Figure 29:
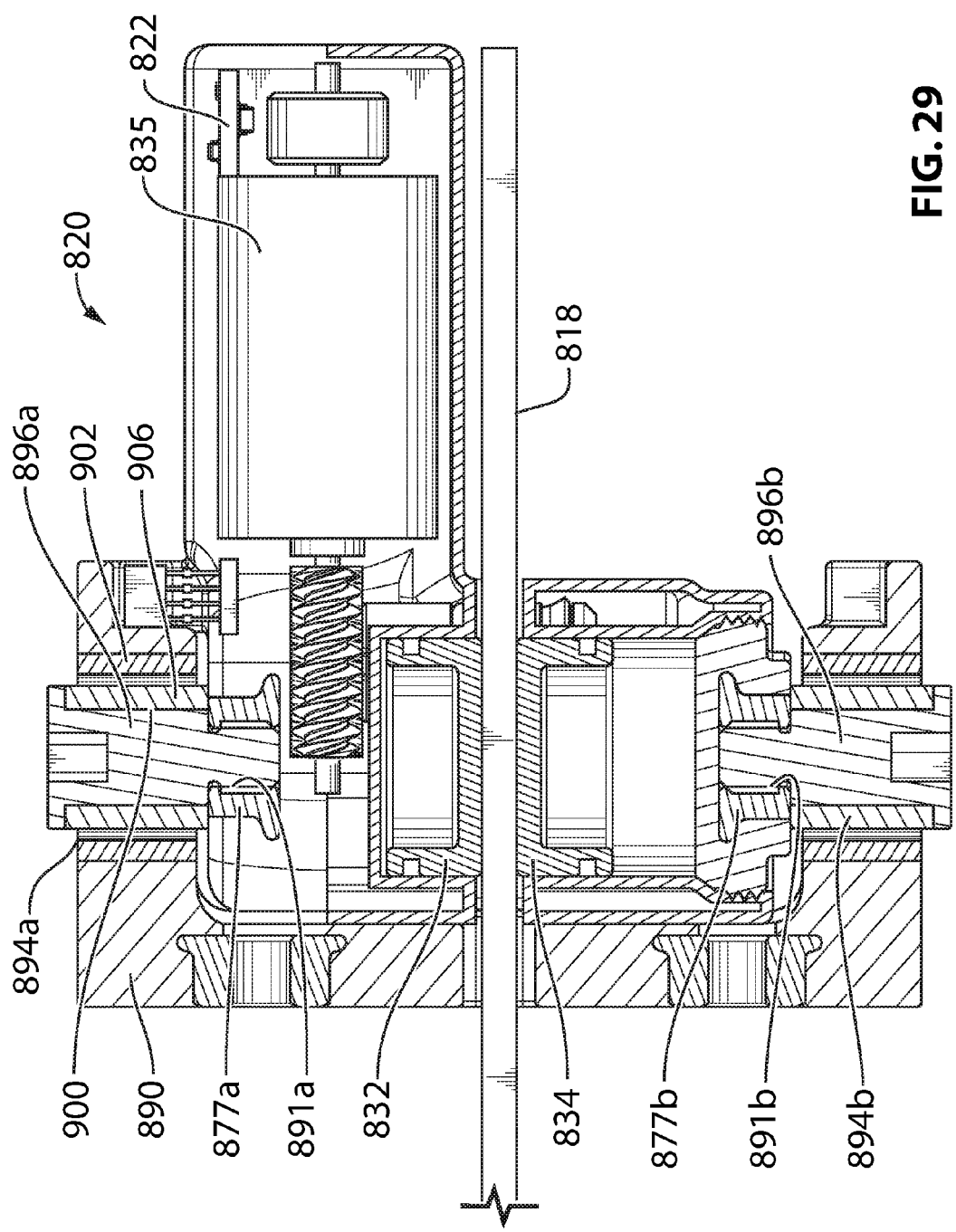
FIG. 29 is a sectional side view of the embodiment shown in FIG. 26.

Referring to FIG. 28, a feature of the flexible connectors 894*a* and 894*b* is that they permit the movement of the check arm housing 820 in the direction DM relative to the mounting bracket 890, while supporting the check arm holder 820 vertically (shown by direction line DV in FIG. 26) and laterally (shown by direction line DL in FIG. 28). This is due to the configuration of the connectors 894*a* and 894*b*. More particularly, with reference to FIGS. 28 and 29, in which the connector 894*a* is shown in more detail, the connector 894*a* includes a peripheral portion 902 that supports the connector 894*a* in the associated aperture (shown at 904 in FIG. 28) in the mounting bracket ear 893*a*. In the embodiment shown the peripheral portion 902 extends all the way around the connector 894*a*, however it need not. The connector 894*a* further includes a core portion 906 that has the aperture 900 which holds the bushing 895*a*. A plurality of arms connect the core portion 906 and the peripheral portion 902. The arms may include two first arms 908 and 910 which extend generally laterally and which support the core portion 906 from one lateral side of the core portion 906 and two second arms 912 and 914 which extend generally laterally and which support the core portion from another lateral side.

Figure 28A:
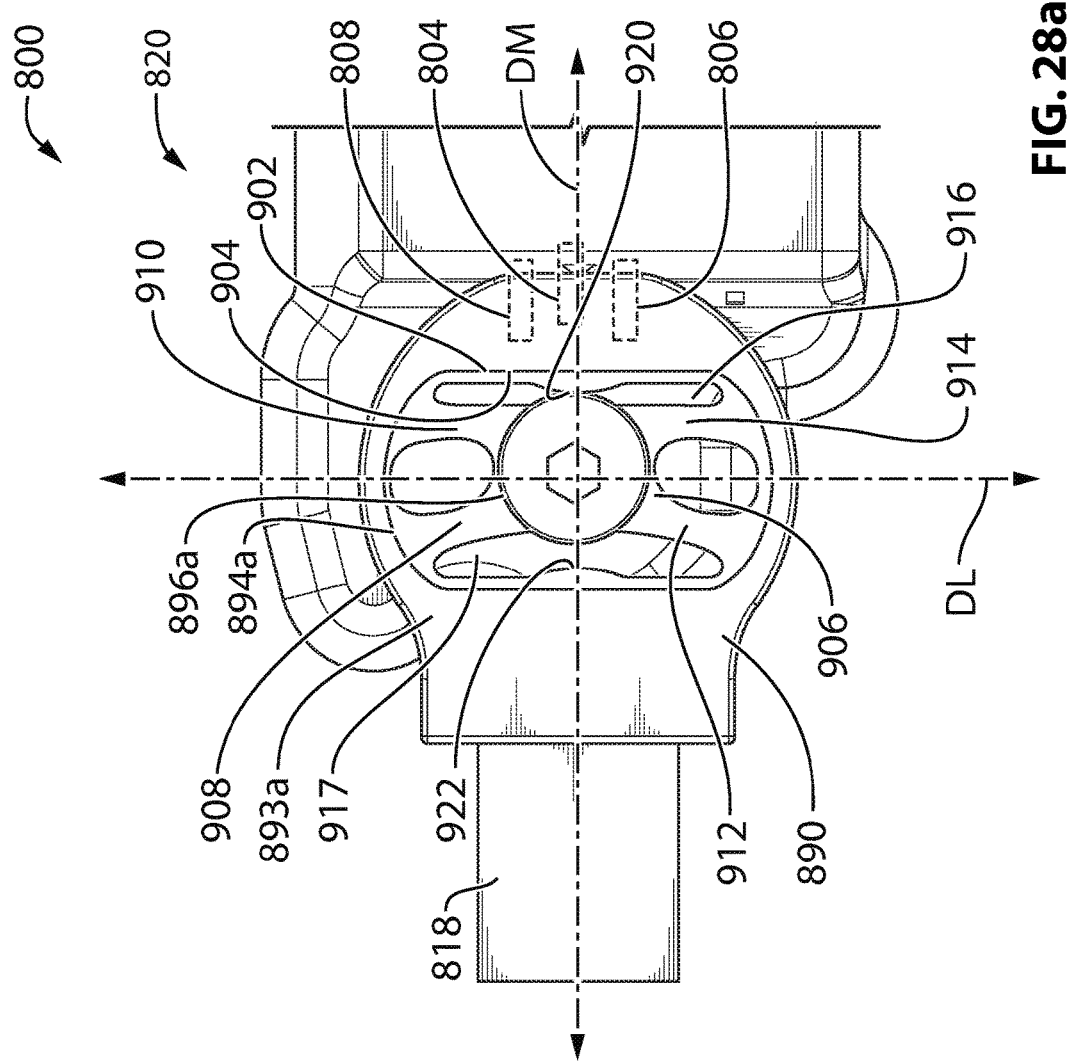
FIG. 28A is a top plan view of the embodiment shown in FIG. 26, illustrating movement of a check arm holder relative to a mounting bracket.

There are first and second gaps shown at 916 and 917 on either side of the core portion 906 in the direction DM. The arms 908, 910, 912 and 914 are sufficiently thin so as to render them deformable in the direction DM, thereby permitting relative movement of the check arm holder 820 relative to the mounting bracket 890 in the direction DM (as shown in FIG. 28A) when a force is applied to the door 16 (FIG. 1). However, the arms 908, 910, 912 and 914 are sufficiently thick in the vertical direction and in the lateral direction DL to permit them to stably support the check arm holder 820 in the vertical and lateral directions DV and DL. In some embodiments such as where there is only one moving brake member 832 it may be desired to permit vertical movement of the check arm holder 820 in addition to permitting movement in the direction DM, however it may be preferable to provide an embodiment as shown in FIGS. 26-29 so as to substantially restrict the movement of the check arm holder 820 to the direction DM. While two arms are shown on each lateral side of the core portion 906 it is possible to provide an embodiment with only one arm on each lateral side of the core portion 906 as long as the arm is sufficiently thick to inhibit lateral movement and vertical movement while being sufficiently thin to permit a useful amount of movement of the check arm holder 820 in the direction DM so as to permit measurement of the movement using the sensor 804.

As a result of the arms 908, 910, 912 and 914, the resilient connectors 894*a* and 894*b* apply a biasing force to the check arm holder 820 to urge the check arm holder 820 towards a home position (FIG. 28) relative to the mounting bracket 890.

Examples of the material of construction for the resilient connectors 894*a* and 894*b* include TPC-ET (thermo plastic polyester elastomer), which is sold, for example, an example of which is sold under the trade name Hytrel 5556, by DuPont Performance Polymers of Wilmington, Del., USA.

The check arm holder 820 is movable in a selected direction relative to the mounting bracket 890 against the biasing force of the at least one resilient connector as a result of a force exerted on the vehicle door 16 by a user. Put another way, during operation, when the door 16 (FIG. 1) is in any particular position, a force being applied to the door 16 by a vehicle user causes flexure of the arms 908, 910, 912 and 914 and consequent relative movement between the check arm holder 820 and the mounting bracket 890 away from the home position in the direction DM (FIG. 28A). This relative movement results in a change in the position of the sensor 804 relative to the magnets 806 and 808 away from the home position, which in turn results in a change in the signal transmitted from the sensor 804 to the controller 822. As a result, the at least one force sensing device 804 is configured to detect movement of the check arm holder 820 in the direction DM relative to the mounting bracket 890 away from the home position.

Since the position of the sensor 804 relative to the magnets 806 is directly related to the force exerted on the door 16 by the user, the controller 822 can determine the force 16 being exerted on the door 16 based on the position of the sensor 804. The controller 822 may determine the force being exerted based on a lookup table using the signal from the sensor 804, based on one or more calculations or a combination of the two.

Using two magnets 806 and 808 instead of one magnet renders the Hall-effect sensor 804 less sensitive to tolerances in its lateral position, as compared to an embodiment wherein there was only one magnet. Because of the arrangement of the magnetic flux lines that would be present in an embodiment with only one magnet, the signal sent by the sensor 804 would change significantly depending on the lateral distance between the sensor 804 and the magnet. As a result, any tolerances in the lateral position of the magnet or the sensor 804 would affect the signal sent to the controller 22 and therefore the ability of the controller 22 to determine the actual force being applied by a user to the door 16. By contrast, when two magnets are present, and positioned with their poles pointing in opposite directions, the arrangement of the magnetic flux lines created in the resulting magnetic circuit results in relatively little change in the signal generated by the sensor 804 over a range of lateral positions. In other words, any lateral tolerance in the position of the sensor 804 relative to the two magnets 806 and 808 does not result in a significant change in the signal sent by the sensor 804 to the controller 822. Thus the sensor 804 is less sensitive to lateral tolerances in its position in such embodiments. Examples of suitable sensors 804 include the A1324, A1325 and A1326 series sensors by Allegro Micro-Systems, LLC of Worcester, Mass., USA.

The controller 822 (FIG. 27) controls the operation of the motor shown at 835 in order to control the pressure in the hydraulic system, thereby controlling the holding force being applied by the pistons 832 and 834 to the check arm 818. The controller 822 may be similar to the controller 22 (FIG. 5), but may be programmed to release a checked door (i.e. to enter the 'TO BRAKE RELEASED' state) based on sensing whether or not the force being applied to the door 16 exceeds a threshold force instead of sensing whether the door 16 has been moved from a checked position by a selected threshold amount.

Referring to FIGS. 28 and 28A, the connector 894a (and the connector 894b which can't be seen in that figure), has first and second bumpers 920 and 922. The gaps 916 and 917 between the core portion 906 and the bumpers 920 and 922 are selected such that the bumpers 920 and 922 limit the amount of flexure that is incurred by the arms 908, 910, 912 and 914 during movement of the check arm holder 820 relative to the mounting bracket 890 before the core portion 906 is supported by one of the bumpers 920 and 922.

The bumpers 920 and 922 may be configured to provide a progressive amount of resistance to travel of the core portion 906, as opposed to being relatively rigid so as to provide a hard stop for the core portion 906 (although such an embodiment is also possible). The controller 822 can be programmed to account for the resistive force of the bumpers 920 and 922 when determining the force being exerted on the door 16 (FIG. 1). By limiting the amount of travel that is incurred by the core portion 906 before it is supported (by one of the bumpers 920 or 922), the connector 894a controls the amount of stress that is incurred by the arms 908, 910, 912 and 914, thereby preventing catastrophic failure of the connectors 894a and 894b, and ensuring at least a selected fatigue life for them. Additionally, particularly when the bumpers 920 and 922 are resilient as opposed to being rigid, the bumpers 920 and 922 can provide some additional damping to the movement of the door 16 when it incurs an overload force and reaches the end of its travel in the opening direction. Furthermore, depending on the strengths and material selections made for the connectors 894a and 894b, the presence of the limit surfaces 920 and 922 can eliminate the need for a limit member on the check arm 818.

It will be noted that the stiffness of the arms 908, 910, 912 and 914 may vary significantly with temperature. As a result, when a vehicle user is applying a certain force on the door 16 in very hot weather, the arms 908, 910, 912 and 914 will have a relatively soft spring rate, and so the force applied by the vehicle user will cause a certain amount of movement of the check arm holder 820 relative to the mounting bracket 890. When the user applies the same amount of force on the door 16 in very cold weather, the arms 908, 910, 912 and 914 will have a relatively stiffer spring rate, and so the force applied by the user will cause a smaller amount of movement of the check arm holder 820. As can be seen, the linear Hall effect sensor 804 may be considered to be a type of position sensor that is connected to the controller 822 and that is positioned on the check arm holder 820, and the magnets 806 and 808 may be considered to be sensor-detectable features in a general sense, which are positioned on the mounting bracket 890, such that movement of the check arm holder 820 relative to the mounting bracket 890 away from the home position causes a change in the signal received by the controller 822 from the position sensor (i.e. the linear Hall effect sensor 804). Because the controller 822 effectively uses the position of the check arm holder 820 to determine whether a selected force has been applied to the door 16, it can beneficially base its determination on input from a temperature sensor, shown at 950 in FIG. 27. The temperature sensor 950 may be one that is supplied as part of the check arm holder 820. Alternatively, the temperature sensor 950 may be one that exists elsewhere in the vehicle 12, in which case input from the temperature 950 may be communicated to the controller 822 via a suitable data bus in the vehicle 12.

In a general sense, it can be seen form the description above that in at least some embodiments, the controller 822 is programmed to control the operation of the check arm holder 920 based on input from a temperature sensor.

In an example, the controller 822 may be programmed to carry out a first action (e.g. to enter the 'TO BRAKE RELEASED' state), at a first distance of the check arm holder 820 from the home position. The controller 822 may use the input from the temperature sensor 950 to vary the value of the first distance. In particular, the value of the first distance may decrease as the temperature sensed by the temperature sensor 950 decreases and may increase as the temperature sensed by the temperature sensor 950 increases. For example, on very cold days, when the resilient connectors 894a and 894b are relatively stiff, a selected force will cause less flexure of the arms 908, 910, 912 and 914 than it would on a warmer day. Thus, the controller 822 may decrease the value for the first distance and release the brake members 832 and 834 when it detects that the check arm holder 820 has moved from the home position by the decreased first distance, since that is indicative of the same force that would have resulted in more flexure of the arms at a higher temperature (which would result in a greater distance for the check arm holder 820 from the home position).

The temperature sensor 950 may also be used in any embodiment that includes a hydraulic system, including the embodiment shown in FIGS. 26-29 and the embodiment shown in FIGS. 5-7. For example, with reference to FIGS. 5-7 which show a hydraulic system in detail, the check arm holder 20 includes a first brake member 32 and a second brake member 34, a master piston 39, and a fluid passage system 44 that fluidically connects the master piston 39 to the at least one of the first and second brake members 32 and 34, wherein the master piston 39 is movable between a retracted position and an advanced position. In the retracted position the master piston 39 generates a first pressure in the fluid passage system 44 which causes the at least one of the first and second brake members 32 and 34 to be in a retracted position and wherein in the advanced position the master piston 39 generates a second pressure in the fluid passage system 44 so as to urge the at least one of the first and second brake members 32 and 34 towards a check position so as to apply a check force on the check arm 18. The check arm holder 20 further includes a master piston actuator 37 operatively connected to the master piston 39 and wherein the controller 22 is programmed to cause the master piston actuator 37 to apply an actuation force on the master piston 39 for moving the master piston 39 between the retracted and advanced positions. In embodiments wherein there is a hydraulic system, the performance of the hydraulic system can be affected by changes in temperature. In particular, the viscosity of the hydraulic fluid can change with temperature, usually to thicken as the temperature drops. As the viscosity increases, the amount of 'drag', or resistance to movement, that is present in the hydraulic system increases, and as a result, a selected amount of force input to the system by the master piston actuator 37 will drive the pistons 32 and 34 to reach a certain clamping force more slowly than they would if the fluid viscosity were lower. In at least some embodiments, the controller 22 is programmed to carry out a change in the clamping force of the pistons 32 and 34 within a selected period of time, such as 0.1 seconds. In order to achieve this consistently regardless of the temperature of the hydraulic fluid, the controller 22 may be programmed to control the force applied by the master piston actuator to the master piston 39 based on input from the temperature sensor 950 (FIG. 27). More particularly, the controller 22 may be programmed to increase the force as the sensed temperature decreases and vice versa.

While it has been shown for the linear Hall effect sensor 804 (FIG. 27) to be positioned on the check arm holder 820 and for the first and second magnets 806 and 808 to be positioned on the mounting bracket 890 (FIG. 26), it will be understood that the linear Hall effect sensor 804 may be positioned on the mounting bracket 890 and for the first and second magnets 806 and 808 to be positioned on the check arm holder 820. Such a sensor 804 could be connected to the controller 822 by an electrical conduit that has sufficient length that it would permit some relative movement of the check arm holder 820 relative to the sensor 804.

While the force sensing device 804 has been described as being a linear Hall effect sensor, it will be understood that any other suitable type of force sensing device may be used.

While the above description constitutes specific examples, these examples are susceptible to further modification and change without departing from the fair meaning of the accompanying claims.

The invention claimed is:

1. A vehicle door control system for a vehicle having a vehicle body and a vehicle door, comprising:
   a check arm having an end that is mounted to one of the vehicle body and the vehicle door;
   a check arm holder at least a portion of which is mounted to the other of the vehicle body and the vehicle door; and
   a controller that is configured to receive input from at least one sensor relating to a force being applied to the vehicle door, wherein the controller includes a memory and a processor, wherein the processor is programmed to selectably cause the check arm holder to apply a selected check force to the check arm to hold the vehicle door stationary, and, in at least a selected set of conditions, the controller is programmed to at least partially release the check force when the processor determines that the force being applied to the vehicle door reaches a selected initiation force,
   wherein the at least one sensor is positioned entirely within an interior of the vehicle door and is positioned to sense movement of the vehicle door without direct contact by a user with the at least one sensor, wherein the controller is programmed to determine via signals from the at least one sensor whether a force applied by the user on the vehicle door in any one of an opening direction and a closing direction exceeds the selected initiation force.

2. A vehicle door control system as claimed in claim 1, wherein the check arm holder is flexibly mounted to a mounting bracket, which is in turn mounted to the other of the vehicle body and the vehicle door,
   and wherein the at least one sensor includes a position sensor that is positioned on one of the mounting bracket and the check arm holder, and that is configured to detect movement of a sensor-detectable feature on the other of the mounting bracket and the check arm holder, wherein the position sensor is configured to transmit signals to the controller based on said detection.

3. A vehicle door control system as claimed in claim 1, wherein the at least one sensor includes a magnetic sensor that is positioned on one of the mounting bracket and the check arm holder and wherein a first magnet is positioned on the other of the mounting bracket and the check arm holder and has first and second poles that are arranged in a selected direction relative to a direction of movement of the check arm holder and the mounting bracket relative to each other when a force is applied to the vehicle door.

4. A vehicle door control system as claimed in claim 1, wherein the processor is programmed to adjust the check force on the check arm to hold the vehicle door stationary, based on at least one selected parameter.

5. A vehicle door control system as claimed in claim 4, wherein the processor is programmed to adjust a value for the initiation force required to cause the processor to at least partially release the check force, based on an angle of inclination of the vehicle.

6. A vehicle door control system as claimed in claim 1, wherein the processor is programmed to determine a speed of the vehicle door based on input from the at least one sensor, and wherein in at least a selected set of conditions the controller is programmed to apply the check force to the check arm when the speed of the vehicle door is below a selected threshold value.

7. A vehicle door control system as claimed in claim 6, wherein the memory contains a maximum permissible open position a maximum permissible speed that progressively decreases as the vehicle door approaches the maximum permissible open position, and wherein the processor is programmed to apply a progressively increasing braking force on the check arm as the door approaches the maximum open position, so as to keep the speed of the vehicle door from exceeding the progressively decreasing maximum permissible speed.

8. A vehicle door control system as claimed in claim 1, wherein, within a selected range from a closed position, the processor is programmed to prevent application of the check force on the check arm.

9. A vehicle door control system as claimed in claim 1, wherein the check arm holder includes a first brake member and a second brake member, an electric actuation device and a drive train through which the motor is operatively connected to at least one of the first and second brake members,
wherein at least one element from the drive train is non-back drivable when no power is transmitted to the actuator.

10. A vehicle door control system as claimed in claim 9, wherein the drive train includes a first gear driven by the motor, a second gear driven by the first gear, a lead screw driven by the second gear and a traveler, wherein at least one of the lead screw and the first gear is non-back drivable.

11. A vehicle door control system as claimed in claim 10, wherein the first gear is a worm.

12. A vehicle door control system as claimed in claim 1,
wherein the check arm holder is configured to apply a variable braking force to the check arm; and
wherein the controller is programmed to receive input from a user of the vehicle that permits the user to select at least one property from the list of properties consisting of: the size of a resistive force applied to the check arm during movement of the vehicle door; the size of the check force applied to the check arm when the vehicle door is stationary; the profile of a relationship between a resistive force applied to the check arm during movement of the vehicle door and the position of the vehicle door; a maximum permissible speed of the vehicle door; a maximum permissible open position for the vehicle door; and a position of at least one virtual detent for the vehicle door.

\* \* \* \* \*